(12) United States Patent
Iwasaki

(10) Patent No.: US 9,116,265 B2
(45) Date of Patent: Aug. 25, 2015

(54) PLANAR LIGHTING DEVICE

(71) Applicant: FUJIFILM CORPORATION, Tokyo (JP)

(72) Inventor: Osamu Iwasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/037,071

(22) Filed: Sep. 25, 2013

(65) Prior Publication Data

US 2014/0022816 A1   Jan. 23, 2014

Related U.S. Application Data

(63) Continuation of application No. PCT/JP2012/050266, filed on Jan. 10, 2012.

(30) Foreign Application Priority Data

Mar. 28, 2011 (JP) ................................. 2011-070907

(51) Int. Cl.
*F21V 8/00* (2006.01)
*G02F 1/1335* (2006.01)
*G02F 1/1333* (2006.01)

(52) U.S. Cl.
CPC ............ *G02B 6/0016* (2013.01); *G02B 6/0041* (2013.01); *G02B 6/005* (2013.01); *G02B 6/0046* (2013.01); *G02F 1/133615* (2013.01); *G02F 2001/133317* (2013.01)

(58) Field of Classification Search
CPC .. G02B 6/0016; G02B 6/0041; G02B 6/0046; G02B 6/005; G02F 1/133615
See application file for complete search history.

(56) References Cited

U.S. PATENT DOCUMENTS 2,646,637 A * 7/1953 Mungall et al. ................. 40/364
5,295,048 A * 3/1994 Park et al. ........................ 362/26

(Continued)

FOREIGN PATENT DOCUMENTS

JP  07-036037 A  2/1995
JP  08-220346 A  8/1996

(Continued)

OTHER PUBLICATIONS

International Preliminary Report on Patentability (Chapter I ); PCT/JP2012/050266; Oct. 21, 2013, and the English translation of Written Opinion of the International Searching Authority.

(Continued)

*Primary Examiner* — Thomas A Hollweg
(74) *Attorney, Agent, or Firm* — Studebaker & Brackett PC

(57) ABSTRACT

There is provided a planar lighting device which can emit light with high light use efficiency and small luminance unevenness. This object is achieved by having a light guide plate including two or more layers overlapping in a direction perpendicular to a light exit surface and having different particle concentrations of the scattering particles, thicknesses of the layers in the direction perpendicular to the light exit surface varying so that a combined particle concentration has, in a direction perpendicular to a light incidence surface, a first local maximum value closer to the light incidence surface and a second local maximum value located farther from the light incidence surface than the first local maximum value and being larger than the first local maximum value; and a microlens film having a plurality of spherical micro-ball lenses formed on a film.

25 Claims, 15 Drawing Sheets

(56) References Cited

U.S. PATENT DOCUMENTS

| | | | |
|---|---|---|---|
| 5,386,347 A * | 1/1995 | Matsumoto | 362/623 |
| 5,555,160 A * | 9/1996 | Tawara et al. | 362/613 |
| 5,899,552 A * | 5/1999 | Yokoyama et al. | 362/619 |
| 5,966,192 A | 10/1999 | Higuchi et al. | |
| 5,993,020 A | 11/1999 | Koike | |
| 6,206,535 B1 * | 3/2001 | Hattori et al. | 362/616 |
| 6,217,184 B1 | 4/2001 | Koike et al. | |
| 6,989,873 B2 * | 1/2006 | Hua-Nan et al. | 349/64 |
| 7,244,059 B2 * | 7/2007 | Onishi | 362/628 |
| 8,477,260 B2 * | 7/2013 | Iwasaki | 349/65 |
| 8,840,746 B2 * | 9/2014 | Kanade et al. | 156/242 |
| 2003/0174396 A1 * | 9/2003 | Murayama et al. | 359/453 |
| 2007/0086191 A1 | 4/2007 | Choi et al. | |
| 2008/0044564 A1 * | 2/2008 | Kanade et al. | 427/203 |
| 2009/0103327 A1 | 4/2009 | Iwasaki et al. | |
| 2009/0103328 A1 | 4/2009 | Iwasaki | |
| 2010/0246208 A1 | 9/2010 | Iwasaki | |
| 2012/0051092 A1 * | 3/2012 | Kanade et al. | 362/629 |
| 2012/0051093 A1 * | 3/2012 | Kanade et al. | 362/629 |

FOREIGN PATENT DOCUMENTS

| | | |
|---|---|---|
| JP | 08-248233 A | 9/1996 |
| JP | 08-271739 A | 10/1996 |
| JP | 11-153963 A | 6/1999 |
| JP | 2001-110220 A | 4/2001 |
| JP | 2003-090919 A | 3/2003 |
| JP | 2004-171948 A | 6/2004 |
| JP | 2004-309557 A | 11/2004 |
| JP | 2005-108676 A | 4/2005 |
| JP | 2005-302322 A | 10/2005 |
| JP | 2007-086784 A | 4/2007 |
| JP | 4127897 B | 5/2008 |
| JP | 2009-117349 A | 5/2009 |
| JP | 2009-117357 A | 5/2009 |
| JP | 2010-257938 A | 11/2010 |

OTHER PUBLICATIONS

An Office Action; "Notification of Reasons for Refusal," issued by the Japanese Patent Office on Sep. 9, 2014, which corresponds to Japanese Patent Application No. 2011-070907 and is related to U.S. Appl. No. 14/037,071; with English language partial translation.

* cited by examiner

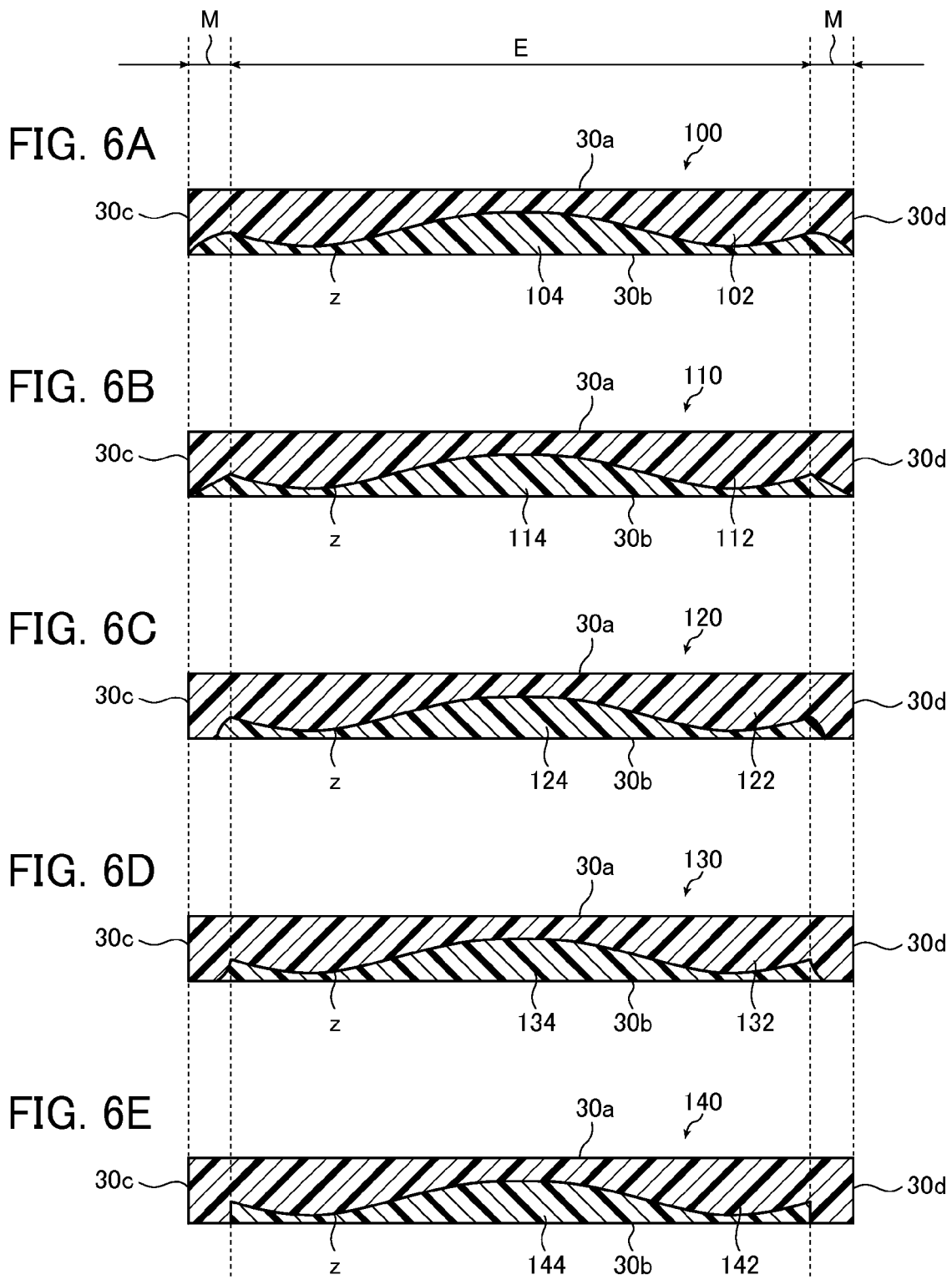

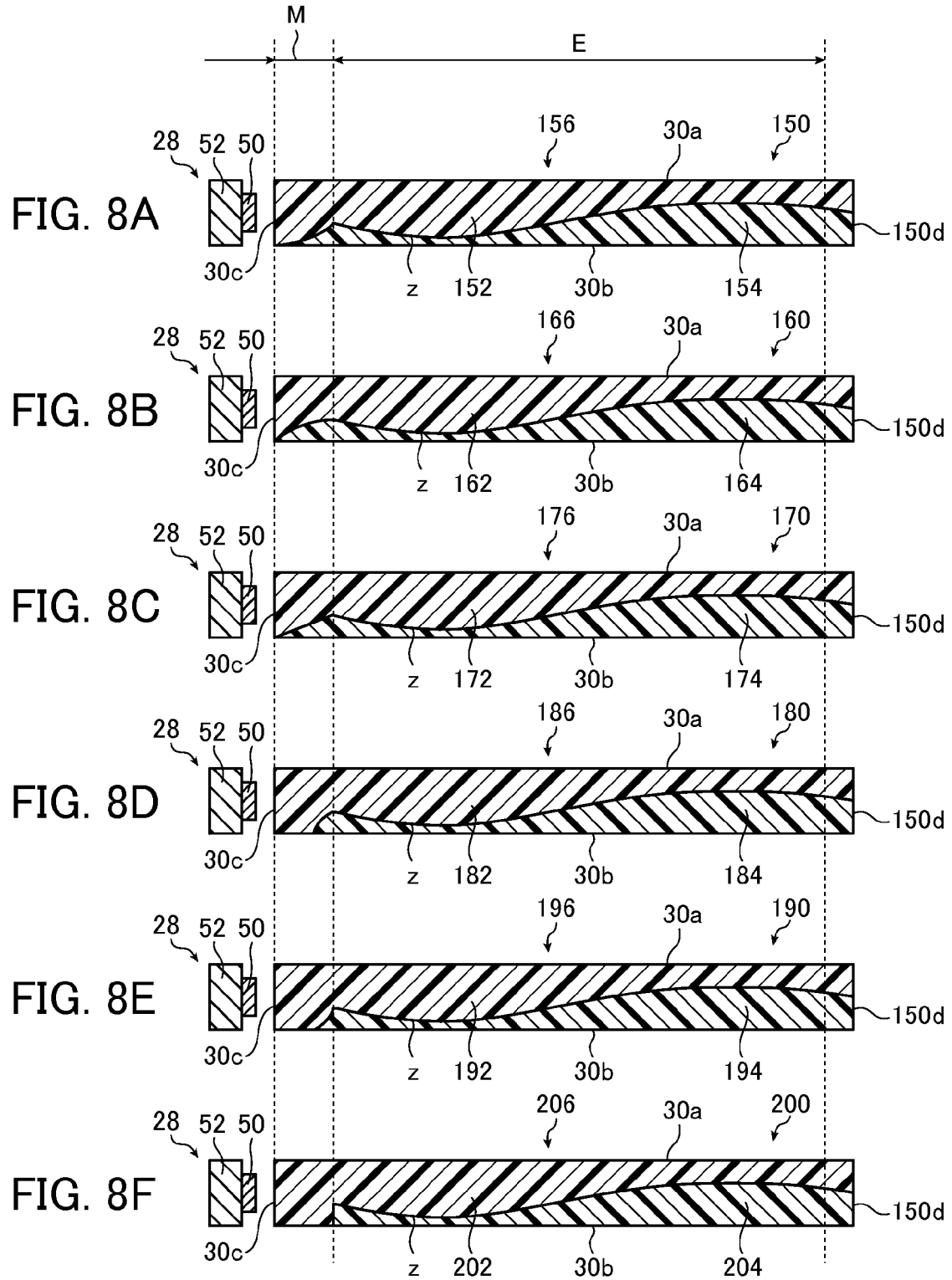

PLANAR LIGHTING DEVICE

BACKGROUND OF THE INVENTION

The present invention relates to a planar lighting device used in a liquid crystal display or the like.

A liquid crystal display uses a planar lighting device (a backlight unit) which illuminates a liquid crystal display panel by irradiation with light from the back side of the liquid crystal display panel. The backlight unit is configured using a light guide plate for diffusing light emitted from an illumination light source to illuminate the liquid crystal display panel and parts such as a prism sheet and a diffusion sheet for making outgoing light from the light guide plate uniform.

Currently, large-size liquid crystal televisions predominantly use a so-called underneath type backlight unit including a light guide plate disposed immediately above an illumination light source. This type of backlight unit ensures uniform light amount distribution and necessary luminance by disposing a plurality of cold cathode tubes used as light sources behind the liquid crystal display panel and providing the inside of the backlight unit with white reflection surfaces.

However, the underneath type backlight unit requires a thickness of about 30 mm in a direction perpendicular to the liquid crystal display panel in order to make the light amount distribution uniform, and accordingly, further reduction in thickness is difficult to achieve.

On the other hand, an exemplary backlight unit that allows the thickness reduction includes one using a light guide plate which guides light, which is emitted from an illumination light source and caused to enter from a surface, in predetermined directions, and emits the guided light through a light exit surface that is different from the surface through which the light is caused to enter.

As a backlight unit using such a light guide plate, a backlight unit of a type using a plate-like light guide member in which scattering particles for scattering light are dispersed in a transparent resin and which causes light to enter from the side surface thereof and causes light to exit through the front surface thereof has been proposed.

For example, JP 07-036037 A discloses a light-scattering and guiding light source device which includes a light-scattering light guide member having at least one light incidence surface region and at least one light exit surface region and light source means for causing light to enter from the light incidence surface region and in which the light-scattering light guide member has a region in which the thickness thereof tends to decrease with increasing distance from a light incidence surface.

JP 08-248233 A discloses a planar light source device including a light-scattering light guide member, a prism sheet disposed on the side closer to a light exit surface of the light-scattering light guide member, and a reflector disposed on the side closer to the rear surface of the light-scattering light guide member. JP 08-271739 A discloses a liquid crystal display including a light exit direction correcting element which is formed of a plate-like optical material and which has a light incidence surface having repeated undulations of a prism train shape and a light exit surface having a light diffusing property. JP 11-153963 discloses a light source device including a light-scattering light guide member having scattering ability therein and light supply means for supplying light from an end surface portion of the light-scattering light guide member.

In addition to the above-mentioned light guide plates, a light guide plate in which the thickness of an intermediate portion is larger than the thicknesses of an end portion of a light incidence side and an end portion of an opposed side, a light guide plate having a reflecting surface which is inclined in a direction in which the thickness increases with increasing distance from a light incidence portion, and a light guide plate having a shape in which the distance between a front surface portion and a rear surface portion is the smallest in a light incidence portion and the thickness at a position most distant from the light incidence portion is the largest have also been proposed as a light guide plate (for example, see JP 2003-090919 A, JP 2004-171948 A, JP 2005-108676 A, JP 2005-302322 A, and JP 08-220346 A).

Furthermore, JP 2009-117349 A discloses a lighting device in which a light exit surface of a light guide member is a concave surface. JP 2009-117357 A discloses a light guide plate in which a light exit surface of the light guide plate is a curved surface convex to downward (that is, the light exit surface is a concave surface).

JP 2009-117357 A discloses a light guide plate including two layers, in which an interface between the first layer and the second layer is an inclined surface inclined in the direction of approaching a light exit surface with increasing distance from an end portion toward the center of the light guide plate (that is, the cross-sectional shape of the light guide plate is an equilateral triangle).

Furthermore, JP 4127897 B (JP 11-345512 A) discloses a planar light source device including a plate-like member in which at least one non-scattering light guide region and at least one scattering light guide region containing particles having different refractive indices uniformly dispersed in the same material as the non-scattering light guide region overlap with each other. In the planar light source device, a distribution of the amount of light emitted from a main surface is controlled by mounting a light source lamp on an end face of the plate-like member and locally adjusting the particle concentration by using the thicknesses of both the regions; and the scattering light guide region is a light guide block having a convex shape while the non-scattering light guide region is a light guide block having a concave shape corresponding to the light guide block having the convex shape.

SUMMARY OF THE INVENTION

However, although a back light unit such as that of a tandem type using a light guide plate of which the thickness decreases with increasing distance from a light source can be employed to achieve a thin back light unit, it has a problem in that its light use efficiency is poorer as compared to the underneath type due to the relative size of a cold cathode tube and a reflector. When a light guide plate having a shape in which a cold cathode tube is accommodated in a groove formed in the light guide plate is used, a shape in which the thickness decreases with increasing distance from the cold cathode tube can be achieved, but there is a problem in that the decrease in the thickness of the light guide plate increases luminance just above the cold cathode tube lying in the groove, and thus luminance unevenness of a light exit surface becomes remarkable. In addition, since light guide plates of such a type have complex shapes, there is also a problem in that the processing costs rise and when such a light guide plate is used for a backlight of a liquid crystal television having a large size, for example, a screen size of 37 inches or more, particularly, 50 inches or more, it leads to high costs.

JP 2003-090919 A, JP 2004-171948 A, JP 2005-108676 A, and JP 2005-302322 A each proposes light guide plate of which the thickness increases with increasing distance from the light incidence surface so as to stabilize manufacturing or suppress luminance (light amount) unevenness using multiple reflection. However, since these light guide plates are transparent so that incident light from a light source penetrates to an end portion on the opposite side, a prism or a dot pattern needs to be applied to the bottom surface.

A method of multi-reflecting incident light and causing the reflected light to exit from a light exit surface by disposing a reflection member at the end portion opposite to the light incidence surface can also be considered, but the thickness of the light guide plate needs to be increased to increase the size, resulting in the increase in the weight and the costs. There is also a problem in that light sources are projected into the light guide plate to cause luminance unevenness and/or illuminance unevenness.

In the lighting device disclosed in JP 08-220346 A, since a serration groove is provided in a reflection surface to form an irregular reflection surface, the thickness of the light guide plate needs to be increased to increase the size. Accordingly, there is a problem in that the weight increases and complex processing is necessary, thereby increasing the costs.

In the planar lighting device disclosed in JP 2009-117349 A, the light exit surface of the light guide plate is a concave surface, but scattering particles are uniformly mixed into the entire light guide plate and thus it is difficult to further decrease the thickness in view of optical characteristics. Further, since the light incidence surface is small, the light use efficiency (incidence efficiency) cannot be improved without increasing the weight of the light guide plate.

The light guide plate disclosed in JP 2009-117357 A is a light guide plate including two layers in which the interface between the first layer and the second layer is inclined in a direction of approaching the light exit surface with increasing distance from the end portion toward the center of the light guide plate, i.e., has a cross-sectional shape of an equilateral triangle. However, adjusting the shape of the second layer to optimize the amount of outgoing light is not taken into account.

In the planar lighting device disclosed in JP 4127897 B (JP 11-345512 A), similarly, adjusting the shape of the scattering light guide region to optimize the amount of outgoing light is not taken into account. In addition, a large-sized light guide plate greatly expands and contracts due to surrounding temperature and humidity, and repeats the expansion and contraction of 5 mm or more in a size of about 50 inches. Accordingly, when the light guide plate is a flat plate, it is not known to which side the light guide plate is bent, the light exit surface side or the reflection surface side. When the light guide plate is bent to the light exit surface side, the expanded and contracted light guide plate pushes up a liquid crystal panel to cause pool-like unevenness in light emitted from the liquid crystal display. In order to avoid this problem, one possible measure may be providing a large distance between the liquid crystal panel and the backlight unit in advance, but this has a problem in that it is not possible to decrease the thickness of the liquid crystal display.

When the backlight unit is decreased in thickness and increased in size, the particle concentration of scattering particles needs to be lowered to guide light to a deep portion of the light guide plate. However, when the particle concentration of scattering particles is low, incident light is not sufficiently diffused in the vicinity of the light incidence surface and thus a visible bright line (a dark line, unevenness) due to intervals of arranged light sources or the like is likely to appear in outgoing light emitted from the vicinity of the light incidence surface.

On the other hand, when the particle concentration of scattering particles in the region in the vicinity of the light incidence surface is high, light entering from the light incidence surface may be reflected in the region in the vicinity of the light incidence surface and is likely to be emitted as return light from the light incidence surface, or outgoing light emitted through the region in the vicinity of the light incidence surface which is not used because the region is covered with the housing is likely to increase.

In a light guide plate in which scattering particles are kneaded and dispersed and which causes light to enter from a side surface of the light guide plate and causes light to exit from the front surface thereof, the light incidence direction and the light exit direction are different by 90° and light is guided to the light exit direction by scattering light in the light guide plate. Here, the scattering of light by the scattering particles is forward scattering. Accordingly, illumination light emitted from the light exit surface is emitted not only in the direction perpendicular to the light exit surface, but also in various directions having angles relative to the direction perpendicular to the light exit surface. Therefore, front luminance of outgoing light is likely to be lowered.

An object of the present invention is to solve the above-mentioned problems of the foregoing related art and to provide a planar lighting device which has a large-size and thin shape, can emit light with high light use efficiency and small luminance unevenness, can obtain a so-called middle-high or bell-shaped brightness distribution, that is, a brightness distribution in which a part around the center of a screen is brighter than the surrounding part as required for a large-size and thin liquid crystal television, and can improve the front luminance and the light use efficiency of outgoing light.

Another object of the present invention is to provide a light guide plate which can reduce return light, which is light emitted from a light incidence surface after it once enters the light guide plate, and outgoing light emitted through a region in the vicinity of a light incidence surface which is not used because the region is covered with a housing, thereby improving the use efficiency of light emitted from an effective region of a light exit surface.

Still another object of the present invention is to provide a light guide plate which can sufficiently diffuse incident light in the vicinity of a light incidence surface and prevent a visible bright line (dark line, unevenness) due to intervals of arranged light sources or the like from appearing in outgoing light emitted from the vicinity of the light incidence surface.

In order to attain the above-described object, the present invention provides A planar lighting device comprising: a light guide plate that includes a rectangular light exit surface, one or more light incidence surfaces which are each disposed on an end side of the light exit surface and through which light traveling in a direction substantially parallel to the light exit surface enters, a rear surface on an opposite side to the light exit surface, scattering particles dispersed in the light guide plate, and two or more layers overlapping in a direction substantially perpendicular to the light exit surface and having different particle concentrations of the scattering particles, thicknesses of the two or more layers in the direction substantially perpendicular to the light exit surface varying so that a combined particle concentration of the light guide plate has, in a direction perpendicular to the one light incidence surface, a first local maximum value on a side closer to one of the one light incidence surface and a second local maximum value located at a position more distant from the one light incidence surface than the position of the first local maximum value and being larger than the first local maximum value; one or more light source units, the one light source unit being so disposed as to face the one light incidence surfaces of the light guide plate; and an optical member unit including a micro-lens film in which a plurality of spherical micro-ball lenses are formed on a film, the optical member unit being disposed on a side closer to the light exit surface of the light guide plate.

Preferably, the two or more layers of the light guide plate include a first layer having a particle concentration of the scattering particles represented by Npo and being located on the side closer to the light exit surface, and a second layer having a particle concentration of the scattering particles represented by Npr and being located on a side closer to the rear surface, and wherein the thickness of the second layer continuously varies so that the thickness of the second layer increases, then decreases, and increases again with increasing distance from the one light incidence surface in a direction perpendicular to the one light incidence surface.

Preferably, the one or more light incidence surfaces include two light incidence surfaces separately disposed on two opposite end sides of the light exit surface and the position of the first local maximum value is located on each of both sides closer to the two light incidence surfaces.

Preferably, the thickness of the second layer has a largest thickness at a central portion of the light exit surface.

Or preferably, the one light incidence surface is disposed on an end side of the light exit surface, and the position of the first local maximum value is located on one side closer to the one light incidence surface.

Preferably, ranges of Npo and Npr satisfy Npo=0 wt % and 0.01 wt %<Npr<0.8 wt %.

Or preferably, ranges of Npo and Npr satisfy 0 wt %<Npo<0.15 wt % and Npo<Npr<0.8 wt %.

Preferably, the rear surface is a flat surface parallel to the light exit surface.

Preferably, a diameter of the micro-ball lenses of the micro-lens film ranges from 10 μm to 100 μm.

Preferably, the micro-ball lenses are randomly arranged on the film.

Preferably, the optical member unit is the micro-lens film, and wherein when a diameter of the micro-ball lenses is $D_L$ and a height thereof is $H_L$, the relationship of the diameter $D_L$ and the height $H_L$ of the micro-ball lenses satisfies $0.42 \leq H_L/D_L < 0.5$.

Or preferably, the optical member unit comprises the micro-lens film and a prism sheet, and wherein when a diameter of the micro-ball lenses is $D_L$ and a height thereof is $H_L$, the relationship of the diameter $D_L$ and the height $H_L$ of the micro-ball lenses satisfies $0.17 \leq H_L/D_L < 0.5$.

Or preferably, the optical member unit comprises the micro-lens film and a diffusing sheet, and wherein when a diameter of the micro-ball lenses is $D_L$ and a height thereof is $H_L$, the relationship of the diameter $D_L$ and the height $H_L$ of the micro-ball lenses satisfies $0.3 \leq H_L/D_L < 0.5$.

Or preferably, the optical member unit comprises the micro-lens film, a prism sheet, and a diffusing sheet, and wherein when a diameter of the micro-ball lenses is $D_L$ and a height thereof is $H_L$, the relationship of the diameter $D_L$ and the height $H_L$ of the micro-ball lenses satisfies $0.08 \leq H_L/D_L < 0.5$.

Preferably, the optical member unit is the micro-lens film, and wherein a ratio $H_L/D_L$ of a diameter $D_L$ and a height $H_L$ of the micro-ball lenses is equal to or more than 0.42 and less than 0.5 and a root-mean-square inclination of surface roughness of the micro-ball lenses ranges from 0.1 to 0.2 or from 1.4 to 1.9.

Or preferably, the optical member unit is the micro-lens film, and wherein a ratio $H_L/D_L$ of a diameter $D_L$ and a height $H_L$ of the micro-ball lenses is equal to or more than 0.08 and equal to or less than 0.3 and a root-mean-square inclination of surface roughness of the micro-ball lenses ranges from 1.0 to 1.9.

Or preferably, the optical member unit is the micro-lens film, and wherein a ratio $H_L/D_L$ of a diameter $D_L$ and a height $H_L$ of the micro-ball lenses is equal to or more than 0.08 and equal to or less than 0.25 and a root-mean-square inclination of surface roughness of the micro-ball lenses ranges from 0.7 to 4.2.

Or preferably, the optical member unit is the micro-lens film, and wherein a ratio $H_L/D_L$ of a diameter $D_L$ and a height $H_L$ of the micro-ball lenses is equal to or more than 0.08 and equal to or less than 0.17 and a root-mean-square inclination of surface roughness of the micro-ball lenses ranges from 0.7 to 7.2.

Preferably, the optical member unit comprises the micro-lens film and a prism sheet, and wherein a ratio $H_L/D_L$ of a diameter $D_L$ and a height $H_L$ of the micro-ball lenses is equal to or more than 0.08 and less than 0.5 and a root-mean-square inclination of surface roughness of the micro-ball lenses ranges from 0.2 to 1.3.

Or preferably, the optical member unit comprises the micro-lens film and a prism sheet, and wherein a ratio $H_L/D_L$ of a diameter $D_L$ and a height $H_L$ of the micro-ball lenses is equal to or more than 0.17 and equal to or less than 0.42 and a root-mean-square inclination of surface roughness of the micro-ball lenses ranges from 0.1 to 1.3.

Or preferably, the optical member unit comprises the micro-lens film and a prism sheet, and wherein a ratio $H_L/D_L$ of a diameter $D_L$ and a height $H_L$ of the micro-ball lenses is equal to or more than 0.08 and equal to or less than 0.17 and a root-mean-square inclination of surface roughness of the micro-ball lenses ranges from 0.2 to 1.9.

Preferably, the optical member unit comprises the micro-lens film and a diffusing sheet, and wherein a ratio $H_L/D_L$ of a diameter $D_L$ and a height $H_L$ of the micro-ball lenses is equal to or more than 0.08 and less than 0.5 and a root-mean-square inclination of surface roughness of the micro-ball lenses ranges from 0.4 to 1.3.

Or preferably, the optical member unit comprises the micro-lens film and a diffusing sheet, and wherein a ratio $H_L/D_L$ of a diameter $D_L$ and a height $H_L$ of the micro-ball lenses is equal to or more than 0.08 and equal to or less than 0.3 and a root-mean-square inclination of surface roughness of the micro-ball lenses ranges from 0.4 to 1.9.

Or preferably, the optical member unit comprises the micro-lens film and a diffusing sheet, and wherein a ratio $H_L/D_L$ of a diameter $D_L$ and a height $H_L$ of the micro-ball lenses is 0.08 and a root-mean-square inclination of surface roughness of the micro-ball lenses ranges from 0.4 to 4.2.

Preferably, the optical member unit comprises the micro-lens film, a prism sheet, and a diffusing sheet, and wherein a ratio $H_L/D_L$ of a diameter $D_L$ and a height $H_L$ of the micro-ball lenses is equal to or more than 0.08 and less than 0.5 and a root-mean-square inclination of surface roughness of the micro-ball lenses ranges from 0.1 to 1.3.

Or preferably, the optical member unit includes the micro-lens film, a prism sheet, and a diffusing sheet, and wherein a ratio $H_L/D_L$ of a diameter $D_L$ and a height $H_L$ of the micro-ball lenses is equal to or more than 0.08 and equal to or less than 0.17 and a root-mean-square inclination of surface roughness of the micro-ball lenses ranges from 0.1 to 1.9.

According to the present invention, it is possible to provide a planar lighting device which has a thin shape, can emit light with high light use efficiency and small luminance unevenness, and can obtain a so-called middle-high or bell-shaped brightness distribution, that is, a brightness distribution in which a part around the center of a screen is brighter than the surrounding part as required for a large-size and thin liquid crystal television.

According to the present invention, since the particle concentration of scattering particles in the vicinity of the light incidence surface is lowered, it is possible to reduce return light emitted from the light incidence surface and outgoing light emitted through a region in the vicinity of the light incidence surface which is not used because the region is covered with a housing, thereby improving the use efficiency of light emitted from the effective region of the light exit surface.

According to the present invention, by combining a micro-lens film, it is possible to improve the front luminance of outgoing light, thereby improving the light use efficiency.

According to the present invention, since a combined particle concentration has a first local maximum value in the vicinity of the light incidence surface, it is possible to sufficiently diffuse light entering from the light incidence surface and to prevent a visible bright line (dark line, unevenness) due to intervals of arranged light sources or the like from appearing in the vicinity of the light incidence surface.

BRIEF DESCRIPTION OF THE DRAWINGS

FIGS. 6A to 6E are schematic cross-sectional views showing other examples of the planar lighting device according to the present invention.

FIGS. 8A to 8F are schematic cross-sectional views showing other examples of the planar lighting device according to the present invention.

DETAILED DESCRIPTION OF THE INVENTION

A planar lighting device according to the invention will be described below in detail with reference to preferred embodiments shown in the accompanying drawings.

Figure 1:
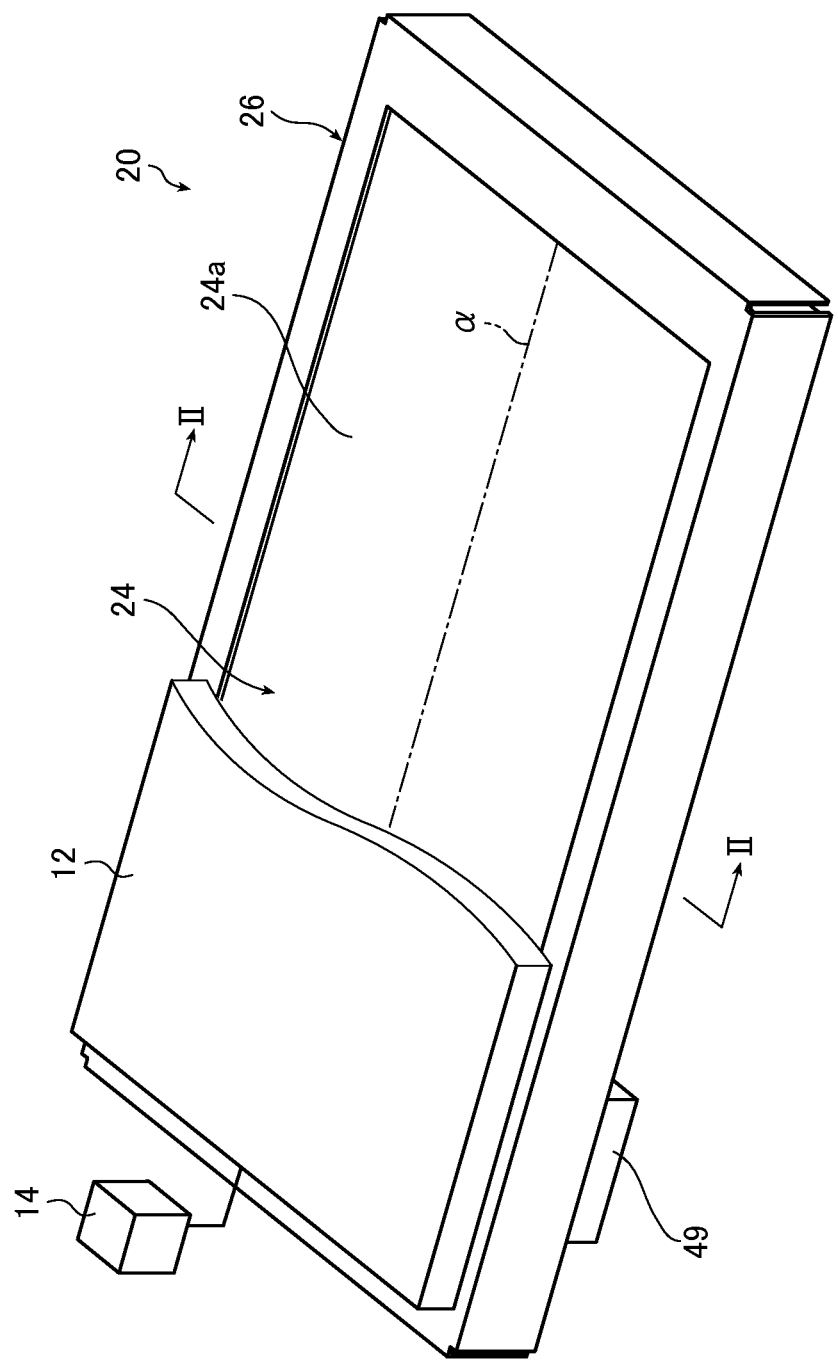
FIG. 1 is a schematic perspective view showing an embodiment of a liquid crystal display provided with a planar lighting device according to the present invention.
Figure 2:
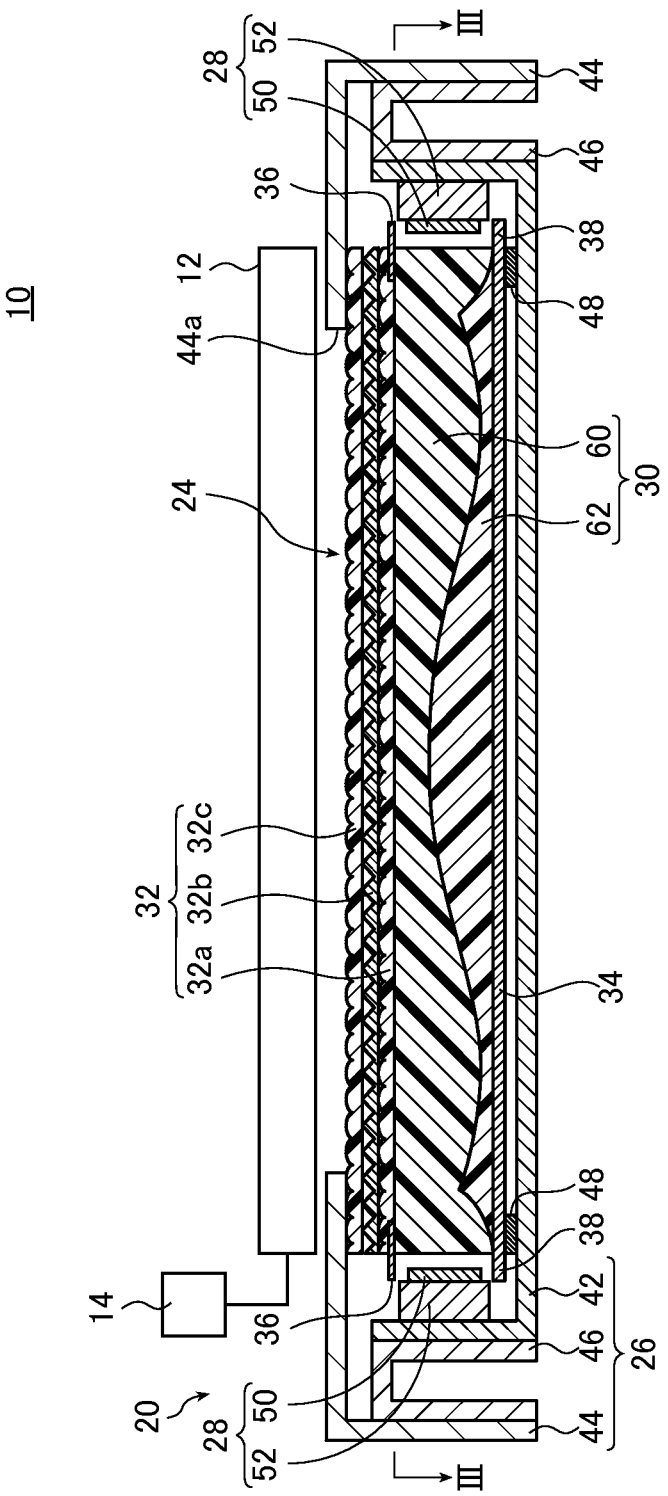
FIG. 2 is a cross-sectional view of the liquid crystal display shown in FIG. 1 taken along line II-II.

FIG. 1 is a perspective view schematically showing a liquid crystal display provided with the planar lighting device according to the invention and FIG. 2 is a cross-sectional view of the liquid crystal display of FIG. 1 taken along line II-II.

Figure 3A:
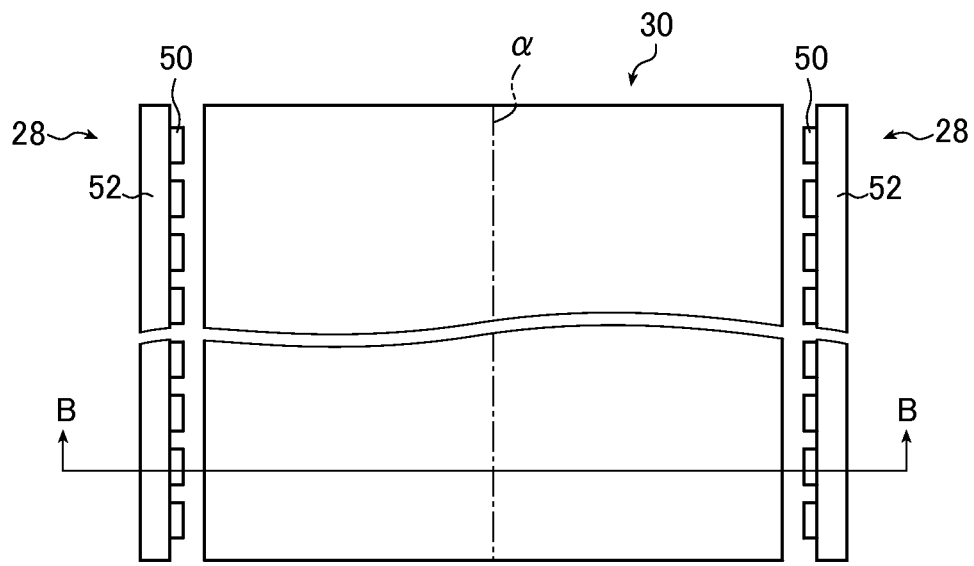
FIG. 3A is a perspective view of the planar lighting device shown in FIG. 2 taken along line and FIG. 3B is a cross-sectional view of FIG. 3A taken along line B-B.
Figure 3B:
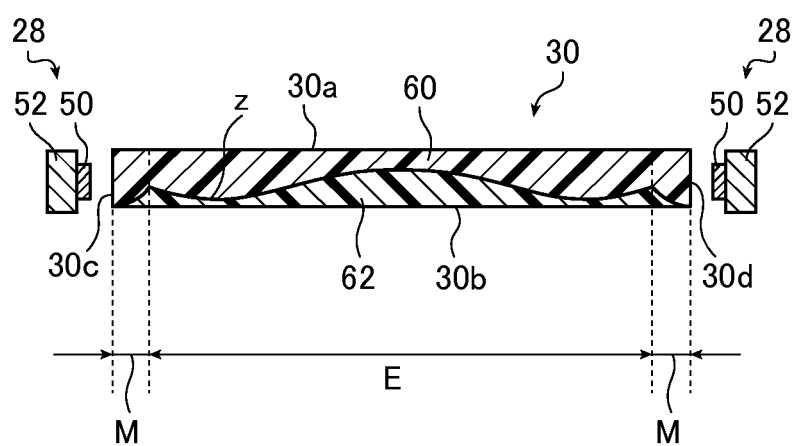

FIG. 3A is a perspective view of the planar lighting device (also referred to below as "backlight unit") shown in FIG. 2 taken along line III-III and FIG. 3B is a cross-sectional view of FIG. 3A taken along line B-B.

A liquid crystal display 10 comprises a backlight unit 20, a liquid crystal display panel 12 disposed on the side closer to a light exit surface of the backlight unit 20, and a drive unit 14 for driving the liquid crystal display panel 12. In FIG. 1, part of the liquid crystal display panel 12 is not shown to illustrate the configuration of the backlight unit.

In the liquid crystal display panel 12, an electric field is partially applied to liquid crystal molecules previously arranged in a specified direction to thereby change the orientation of the molecules. The resultant changes in refractive index having occurred in the liquid crystal cells are used to display characters, figures, images and the like on the surface of the liquid crystal display panel 12.

The drive unit 14 applies a voltage to transparent electrodes in the liquid crystal display panel 12 to change the orientation of the liquid crystal molecules, thereby controlling the transmittance of light passing through the liquid crystal display panel 12.

The backlight unit 20 is a lighting device for illuminating the whole surface of the liquid crystal display panel 12 from the back side of the liquid crystal display panel 12 and comprises the light exit surface 24a of which the shape is substantially the same as an image display surface of the liquid crystal display panel 12.

As shown in FIGS. 1, 2, 3A, and 3B, the backlight unit 20 according to this embodiment comprises a lighting device main body 24 having two light source units 28, a light guide plate 30, and an optical member unit 32 and a housing 26 having a lower housing 42, an upper housing 44, folded members 46, and support members 48. As shown in FIG. 1, a power unit casing 49 containing a plurality of power supplies for supplying the light source units 28 with electric power is disposed on the back side of the lower housing 42 of the housing 26.

Components constituting the backlight unit 20 will be described below.

The lighting device main body 24 comprises the light source units 28 for emitting light, the light guide plate 30 for emitting the light from the light source units 28 as planar light, and the optical member unit 32 for scattering or diffusing the light emitted from the light guide plate 30 to further reduce the unevenness of the light.

First, the light source units 28 will be described.

Figure 4A:
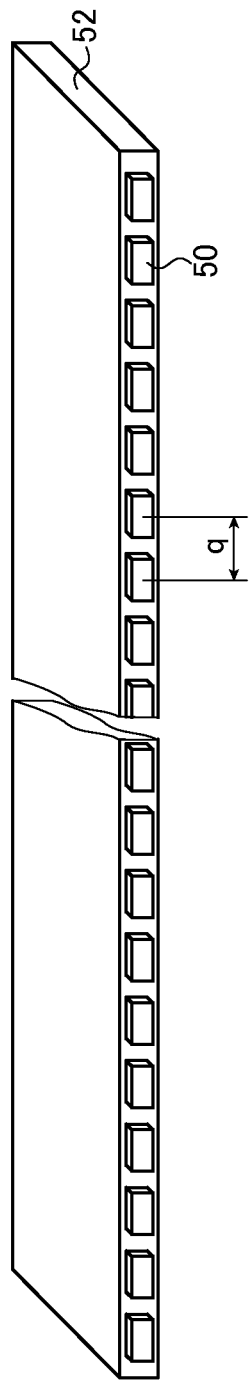
FIG. 4A is a perspective view showing the schematic configuration of a light source unit of the planar lighting device shown in FIGS. 1 and 2.
Figure 4B:
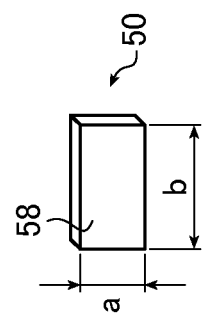
FIG. 4B is an enlarged schematic perspective view showing one of LEDs of the light source unit shown in FIG. 4A.

FIG. 4A is a schematic perspective view schematically showing the configuration of the light source unit 28 of the backlight unit 20 shown in FIGS. 1 and 2. FIG. 4B is an enlarged schematic perspective view showing only one LED chip of the light source unit 28 shown in FIG. 4A.

As shown in FIG. 4A, the light source unit 28 comprises a plurality of light emitting diode chips (referred to below as "LED chips") 50 and a light source support 52.

The LED chip 50 is a chip of a light emitting diode emitting blue light, which has a phosphor applied to the surface thereof. The LED chip 50 has a light-emitting face 58 with a predetermined area and emits white light from the light-emitting face 58.

Specifically, when blue light emitted from the surface of the light emitting diode of the LED chip 50 passes through the phosphor, the phosphor emits fluorescence. Thus, the blue light emitted from the light emitting diode is combined with the light emitted as a result of the fluorescence of the phosphor to produce white light, which is emitted from the LED chip 50.

Examples of the LED chip 50 include chips obtained by applying a YAG (yttrium aluminum garnet) phosphor to the surface of a GaN light emitting diode, an InGaN light emitting diode, and the like.

The light source support 52 is a Plate-like member of which one surface faces the light incidence surface (30c or 30d) of the light guide plate 30.

The light source support 52 supports plural LED chips 50 on a side surface facing the light incidence surface (30c or 30d) of the light guide plate 30 with the LED chips spaced apart from each other at predetermined intervals. Specifically, the plural LED chips 50 constituting the light source unit 28 are arranged in an array shape in the longitudinal direction of a first light incidence surface 30c or a second light incidence surface 30d of the light guide plate 30 to be described later, in other words, in a direction parallel to a line at which the light exit surface 30a and the first light incidence surface 30c meets each other or in a direction parallel to a line at which the light exit surface 30a and the second light incidence surface 30d meets each other, and are fixed to the light source support 52.

The light source support 52 is formed of a metal having high heat conductivity such as copper or aluminum and also serves as a heat sink absorbing heat generated from the LED chips 50 and dissipating the generated heat to the outside. The light source support 52 may be provided with fins capable of increasing the surface area and the heat dissipation effect or heat pipes for transferring heat to a heat dissipating member.

As shown in FIG. 4B, each LED chip 50 according to this embodiment has a rectangular shape in which the length in a direction perpendicular to the direction along the array of the LED chips 50 is smaller than the length in a direction along the array thereof, that is, a rectangular shape in which the thickness direction (direction perpendicular to the light exit surface 30a) of the light guide plate 30 to be described later is a short side. In other words, the LED chip 50 has a shape which satisfies $b>a$ where the length in the direction perpendicular to the light exit surface 30a of the light guide plate 30 is defined as a and the length in the array direction is defined as b. When the interval between adjacent LED chips 50 is defined as q, $q>b$ is satisfied. Thus, it is preferable that the relationship of the length a in the direction perpendicular to the light exit surface 30a of the light guide plate 30, the length b in the array direction, and the interval q of the LED chips 50 satisfies $q>b>a$.

By setting each LED chip 50 to have a rectangular shape, it is possible to provide a thin light source while maintaining the output of a large amount of light. The decrease in the thickness of the light source unit 28 leads to the decrease in the thickness of a backlight unit. It is also possible to reduce the number of LED chips to be arranged.

While the LED chips 50 each preferably have a rectangular shape with the short side lying in the thickness direction of the light guide plate 30 for a thinner design of the light source unit 28, the invention is not limited thereto and LED chips having various shapes such as a square shape, a circular shape, a polygonal shape, and an elliptical shape may be used.

Next, the light guide plate 30 will be described below.

Figure 5:
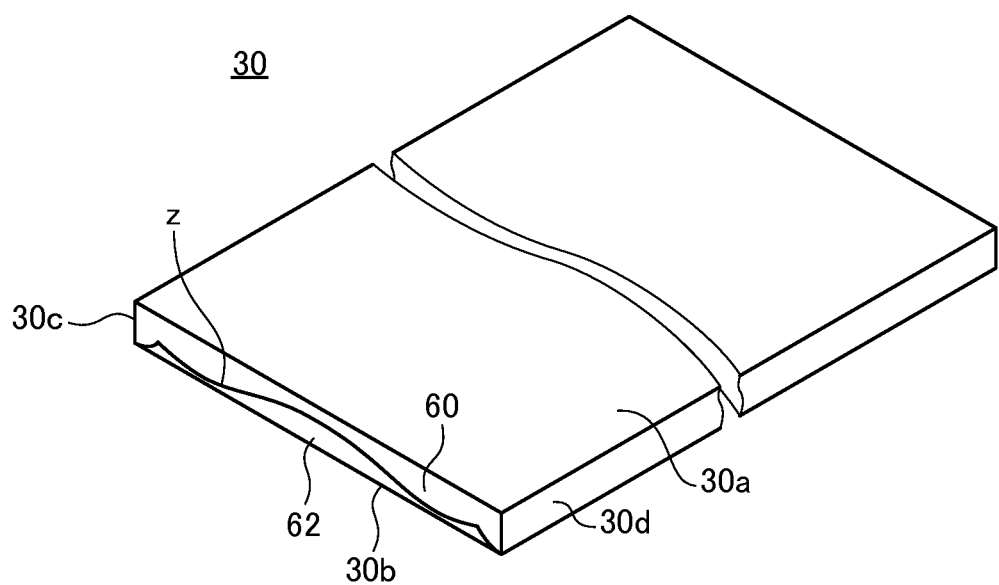
FIG. 5 is a schematic perspective view showing the shape of a light guide plate shown in FIG. 3A.

FIG. 5 is a schematic perspective view showing the shape of the light guide plate 30.

As shown in FIGS. 2, 3A, 3B, and 5, the light guide plate 30 includes the rectangular light exit surface 30a, the two light incidence surfaces (the first light incidence surface 30c and the second light incidence surface 30d) formed at both ends on the long sides of the light exit surface 30a so as to be substantially perpendicular to the light exit surface 30a, and a flat rear surface 30b located on the opposite side of the light exit surface 30a, that is, on the back side of the light guide sheet 30.

In the following description, when the first light incidence surface 30c and the second light incidence surface 30d do not have to be distinguished from each other, they are simply referred to as light incidence surfaces.

The two light source units 28 mentioned above are disposed so as to face the first light incidence surface 30c and the second light incidence surface 30d of the light guide plate 30, respectively. In this embodiment, the light-emitting face 58 of each LED chip 50 in the light source units 28 has substantially the same length as the first light incidence surface 30c and the second light incidence surface 30d in the direction substantially perpendicular to the light exit surface 30a.

Thus, the backlight unit 20 has the two light source units 28 disposed so as to interpose the light guide plate 30 therebetween. In other words, the light guide plate 30 is disposed between the two light source units 28 facing each other with a predetermined space therebetween.

The light guide plate 30 is formed by kneading and dispersing scattering particles for scattering light into a transparent resin. Exemplary materials of the transparent resin used for the light guide plate 30 include optically transparent resins such as PET (polyethylene terephthalate), PP (polypropylene), PC (polycarbonate), PMMA (polymethyl methacrylate), benzyl methacrylate, MS resin, and COP (cycloolefin polymer). Silicone particles such as TOSPEARL (registered trademark), silica particles, zirconia particles, dielectric polymer particles, and the like may be used as the scattering particles to be kneaded and dispersed into the light guide plate 30.

The light guide plate 30 has a two-layer structure including a first layer 60 on the side closer to the light exit surface 30a and a second layer 62 on the side closer to the rear surface 30b. When the boundary between the first layer 60 and the second layer 62 is referred to as "interface z", the first layer 60 has a sectional region surrounded by the light exit surface 30a, the first light incidence surface 30c, the second light incidence surface 30d, and the interface z. On the other hand, the second layer 62 is a layer adjacent to the first layer 60 on the side closer to the rear surface 30b and has a sectional region surrounded by the interface z and the rear surface 30b.

When the particle concentration of the scattering particles in the first layer 60 and the particle concentration of the scattering particles in the second layer 62 are denoted by Npo and Npr, respectively, Npo and Npr have a relationship expressed by Npo<Npr. That is, in the light guide plate 30, the second layer on the side closer to the rear surface 30b contains the scattering particles at a higher particle concentration than the first layer on the side closer to the light exit surface 30a.

When seen from a cross-section perpendicular to the longitudinal direction of the light incidence surface, the interface z between the first layer 60 and the second layer 62 continuously varies so that the second layer 62 decreases in thickness from the position corresponding to the bisector α (that is, the central portion of the light exit surface 30a) toward the first light incidence surface 30c and the second light incidence surface 30d, and then continuously varies so that the second layer once increases in thickness in the vicinity of the first light incidence surface 30c and the second light incidence surface 30d and then decreases in thickness again.

Specifically, the interface z includes a curved surface convex toward the light exit surface 30a in the central portion of the light guide plate 30, concave curved surfaces smoothly connected to the convex curved surface, and concave curved surfaces connected to the concave curved surfaces and connected to ends of the light incidence surfaces 30c and 30d on the side closer to the rear surface 30b. The thickness of the second layer 62 on the light incidence surfaces 30c and 30d is zero.

In this way, the thickness of the second layer 62 containing scattering particles at a higher particle concentration than that in the first layer 60 continuously varies so that the second layer has a first local maximum value at which the thickness is increased in the vicinities of the light incidence surfaces and a second local maximum value at which the thickness is the largest at the central portion of the light guide sheet, and accordingly, the combined particle concentration of the scattering particles varies so as to have the first local maximum value in the vicinity of each of the first and second light incidence surfaces (30c and 30d) and the second local maximum value at the central portion of the light guide sheet, the second local maximum value being larger than the first local maximum value.

The combined particle concentration in the invention means a concentration of scattering particles expressed using the amount of scattering particles added (combined) in a direction substantially perpendicular to the light exit surface at a position spaced apart from one light incidence surface toward the other on the assumption that the light guide plate is a flat plate having the thickness at the light incidence surfaces throughout the light guide plate. In other words, the combined particle concentration means the number of scattering particles per unit volume or a weight percentage with respect to the base material of scattering particles added in a direction substantially perpendicular to the light exit surface at a position spaced apart from the light incidence surface on the assumption that the light guide plate is a flat light guide plate which has the thickness of the light incidence surfaces throughout the light guide plate and which has the same concentration.

The first local maximum value in thickness of the second layer 62 (combined particle concentration) is located at the edge of an opening 44a of the upper housing 44 (see FIG. 2). The regions from the light incidence surfaces 30c and 30d to their corresponding positions of the first local maximum value are located outside the opening 44a of the upper housing 44, that is, in the frame portion forming the opening 44a, and thus does not contribute to the emission of light as the backlight unit 20. In other words, the regions from the light incidence surfaces 30c and 30d to their corresponding positions of the first local maximum value are so-called mixing zones M for diffusing light having entered through the light incidence surfaces. The region which is closer to the central portion of the light guide plate than the mixing zones M, that is, the region corresponding to the opening 44a of the upper housing 44, is an effective screen area E and is a region contributing to the emission of light as the backlight unit 20.

In this way, by adjusting the combined particle concentration of the light guide plate 30 (thickness of the second layer) so that the concentration has the second local maximum value which is the largest in the central portion of the light guide plate, light entering through the light incidence surfaces 30c and 30d can travel to positions farther from the light incidence surfaces 30c and 30d even if the light guide plate is large and thin, whereby outgoing light can have a luminance distribution which is high in the middle.

In addition, by adjusting the combined particle concentration so as to have the first local maximum value in the vicinities of the light incidence surfaces 30c and 30d, light entering through the light incidence surfaces 30c and 30d can be sufficiently diffused in the vicinities of the light incidence surfaces to prevent a visible bright line (dark line, unevenness) due to intervals of arranged light sources or the like from appearing in the outgoing light emitted from the vicinity of the light incidence surface.

Moreover, by adjusting the combined particle concentration so that the regions on the sides closer to the light incidence surfaces 30c and 30d than the positions where the combined particle concentration takes the first local maximum value have a lower combined particle concentration than the first local maximum value, return light, which is light emitted through the light incidence surfaces after it once enters the light guide plate, and outgoing light emitted through the regions in the vicinities of the light incidence surfaces (mixing zones M) which are not used because the regions are covered with the housing can be reduced, thereby improving the use efficiency of light emitted through an effective region of the light exit surface (effective screen area E).

By locating the position at which the combined particle concentration has the first local maximum value to be closer to the light incidence surfaces 30c and 30d than the opening 44a of the upper housing 44, it is possible to reduce outgoing light emitted through the regions in the vicinities of the light incidence surfaces (mixing zones M) which are not used because the regions are covered with the housing, thereby improving the use efficiency of light emitted from the effective region (effective screen area E) of the light exit surface.

The adjustment of the shape of the interface z enables the luminance distribution (the concentration distribution of scattering particles) as well to be set as desired to improve the efficiency to the maximum extent possible.

In addition, since the particle concentration of the layer on the side closer to the light exit surface is reduced, the total amount of scattering particles used can be reduced, thereby leading to cost reduction.

In the illustrated example, the combined particle concentration is adjusted so as to have the first local maximum value at the edge of the opening 44a of the upper housing 44, but the invention is not limited to this configuration. The combined particle concentration may have the first local maximum value at positions inside the opening 44a or in the frame portion of the surface of the upper housing 44 having the opening 44a (outside the opening 44a), as long as the combined particle concentration has the first local maximum value near the edge of the opening 44a of the upper housing 44. In other words, the combined particle concentration may have the first local maximum value at positions in the effective screen area E or at positions in the mixing zones M.

The light guide plate 30 is partitioned into the first layer 60 and the second layer 62 by the interface z, but the first layer 60 and the second layer 62 are different from each other in only particle concentration, have a configuration in which the same scattering particles are dispersed in the same transparent resin, and are structurally integrated. That is, when the light guide plate 30 is partitioned with the interface z as a reference, the particle concentrations of the regions are different from each other, but the interface z is only a virtual surface and the first layer 60 and the second layer 62 are integrated.

The light guide plate 30 can be formed through an extrusion molding method or an injection molding method.

In the light guide plate 30 shown in FIG. 2, light emitted from the light source units 28 and allowed to enter the light guide plate 30 through the first light incidence surface 30c and the second light incidence surface 30d is scattered by a scattering material (scattering particles) contained in the light guide plate 30, as it travels through the inside of the light guide plate 30, and is emitted through the light exit surface 30a directly or after having been reflected by the rear surface 30b. At this time, part of light may leak through the rear surface 30b but the leaked light is reflected by a reflecting plate 34 disposed on the side closer to the rear surface 30b of the light guide plate 30 and enters the light guide plate 30 again. The reflecting plate 34 will be described later in detail.

Further, the particle concentration Npo of the scattering particles in the first layer 60 and the particle concentration Npr of the scattering particles in the second layer 62 preferably satisfy the relationships of 0 wt %<Npo<0.15 wt % and Npo<Npr<0.8 wt %.

When the first layer 60 and the second layer 62 of the light guide plate 30 satisfy the above relationships, the light guide plate 30 can guide incident light to the inside (center) of the light guide plate 30 without scattering the incident light so much in the first layer 60 having a lower particle concentration, and the light is scattered by the second layer 62 having a higher particle concentration as it approaches the center of the light guide plate, thereby increasing the amount of light emitted through the light exit surface 30a. In brief, the illuminance distribution which is high in the middle at a preferable ratio can be obtained while further enhancing the light use efficiency.

The particle concentration [wt %] mentioned herein means a ratio of the weight of the scattering particles to the weight of the base material.

Further, the particle concentration Npo of the scattering particles in the first layer 60 and the particle concentration Npr of the scattering particles in the second layer 62 preferably satisfy the relationships of Npo=0 wt % and 0.01 wt %<Npr<0.8 wt %. In other words, the light guide plate may be configured such that the scattering particles are not kneaded and dispersed in the first layer 60 so as to guide incident light to a deep part of the light guide plate 30 and the scattering particles are kneaded and dispersed in only the second layer 62 so as to further scatter the light as it approaches the center of the light guide plate, thereby increasing the amount of light emitted through the light exit surface 30a.

When the first layer 60 and the second layer 62 of the light guide plate 30 satisfy the above-mentioned relationships, the illuminance distribution which is high in the middle at a preferable ratio can be obtained while further enhancing the light use efficiency as well.

The thickness of the light guide plate used in the present invention is not particularly limited, and the light guide plate may have a thickness of several millimeters or the light guide plate may be a so-called light guide sheet of a film shape, with a thickness of 1 mm or less. As a method of forming the film-like light guide plate in which scattering particles are dispersed in two layers at different particle concentrations, a method of forming a base film containing scattering particles as a first layer using an extrusion molding method or the like, forming a second layer having a desired particle concentration by applying a monomer resin liquid (liquid of a transparent resin) having scattering particles dispersed therein onto the base film and irradiating ultraviolet rays or visual rays to the applied monomer resin liquid to cure the monomer resin liquid, thereby forming a film-like light guide plate, can be used. A two-layer extrusion molding method or the like can also be used.

Even when the light guide plate is a film-like light guide sheet with a thickness of 1 mm or less, it is possible to achieve the illuminance distribution which is high in the middle at a favorable ratio while further improving the light use efficiency by employing the two-layered structure.

In the light guide plate 30 of the illustrated example, the interface z has a shape formed to have curved surfaces which are concave to the light exit surface 30a in the regions from the positions of the first local maximum value to the corresponding light incidence surfaces 30c and 30d and which are connected to the ends of the light incidence surfaces 30c and 30d on the side closer to the rear surface 30b, but the present invention is not limited thereto.

FIGS. 6A to 6E are schematic diagrams showing other examples of the light guide plate according to the present invention.

Light guide plates 100, 110, 120, 130, and 140 shown in FIGS. 6A to 6E have the same configuration as the light guide plate 30 shown in FIG. 3B, except that the thickness of each of the first layer and the second layer in the mixing zones M, that is, the shape of the interface z from the light incidence surfaces 30c and 30d to the positions of the first local maximum value is changed. Accordingly, the same elements will be denoted by the same reference numerals and different elements will be mainly described below.

The light guide plate 100 shown in FIG. 6A is composed of a first layer 102 and a second layer 104 having a particle concentration higher than that of the first layer 102. The shape of the interface z between the first layer 102 and the second layer 104 in the mixing zones M is formed to have curved surfaces which are connected to the positions of the first local maximum value, are convex to the light exit surface 30a, and are connected to the ends of the light incidence surfaces 30c and 30d on the side closer to the rear surface 30b.

The light guide plate 110 shown in FIG. 6B is composed of a first layer 112 and a second layer 114 having a particle concentration higher than that of the first layer 112. The shape of the interface z between the first layer 112 and the second layer 114 in the mixing zones M is formed to have planar surfaces which are connected to the positions of the first local maximum value and to the ends of the light incidence surfaces 30c and 30d on the side closer to the rear surface 30b.

The light guide plate 120 shown in FIG. 6C is composed of a first layer 122 and a second layer 124 having a particle concentration higher than that of the first layer 122. The shape of the interface z between the first layer 122 and the second layer 124 in the mixing zones M is formed to have curved surfaces which are connected to the positions of the first local maximum value, are convex to the light exit surface 30a, and are connected to the rear surface 30b substantially in the middle of the mixing zones M.

The light guide plate 130 shown in FIG. 6D is composed of a first layer 132 and a second layer 134 having a particle concentration higher than that of the first layer 132. The shape of the interface z between the first layer 132 and the second layer 134 in the mixing zones M is formed to have curved surfaces which are connected to the positions of the first local maximum value, are concave to the light exit surface 30a, and are connected to the rear surface 30b substantially in the middle of the mixing zones M.

The light guide plate 140 shown in FIG. 6E is composed of a first layer 142 and a second layer 144 having a particle concentration higher than that of the first layer 142. In the mixing zone M, the light guide plate 140 has only the first layer 142. That is, the shape of the interface z is a planar surface which is located at the position of the first local maximum value and is parallel to the light incidence surfaces 30c and 30d.

As in the light guide plates shown in FIGS. 6A to 6E, by forming the shape of the interface Z so as to reduce the thickness of the second layer from the position of the first local maximum value to the light incidence surfaces 30c and 30d, the combined particle concentration of the region from the position of the first local maximum value to the sides of the light incidence surfaces 30c and 30d (mixing zone M) is set to a combined particle concentration lower than the first local maximum value and it is thus possible to reduce return light which is incident light emitted from the light incidence surfaces or outgoing light emitted from the regions in the vicinities of the light incidence surfaces (mixing zones M) which are not used because the regions are covered with the housing, thereby improving use efficiency of light emitted from an effective region (effective screen area E) of the light exit surface.

In a cross-section perpendicular to the longitudinal direction of the light incidence surface, the concave curved surfaces and the convex curved surfaces forming the interface z may be curves expressed as parts of a circle or an ellipse, quadratic curves, curves expressed by polynomials, or combined curves thereof.

In the illustrated example, the light exit surface 30a is flat, but the invention is not limited thereto. The light exit surface may be a concave surface. By employing the concave surface as the light exit surface, it is possible to prevent the light guide plate from warping toward the light exit surface upon expansion or contraction due to heat or moisture and from coming in contact with the liquid crystal display accordingly.

In the illustrated examples, the rear surface 30b is flat, but the invention is not limited thereto. The rear surface may be a concave surface, that is, a surface inclined in a direction in which the thickness decreases with increasing distance from the light incidence surfaces or may be a convex surface, that is, a surface inclined in a direction in which the thickness increases with increasing distance from the light incidence surfaces.

Next, the optical member unit 32 will be described below.

The optical member unit 32 serves to modify illumination light emitted from the light exit surface 30a of the light guide plate 30 to be light having less luminance unevenness and less illuminance unevenness to be emitted from the light exit surface 24a of the lighting device body 24. As shown in FIG. 2, the optical member unit 32 has a micro-lens film 32a disposed to face the light exit surface 30a of the light guide plate 30, a prism sheet 32b disposed to face the surface of the micro-lens film 32a on the side of emitting light, and a micro-lens film 32c disposed to face the surface of the prism sheet 32b on the side of emitting light. The light emitted from the light exit surface 30a sequentially passes through the micro-lens film 32a, the prism sheet 32b, and the micro-lens film 32c and is emitted from the light exit surface of the lighting device body.

Figure 7A:
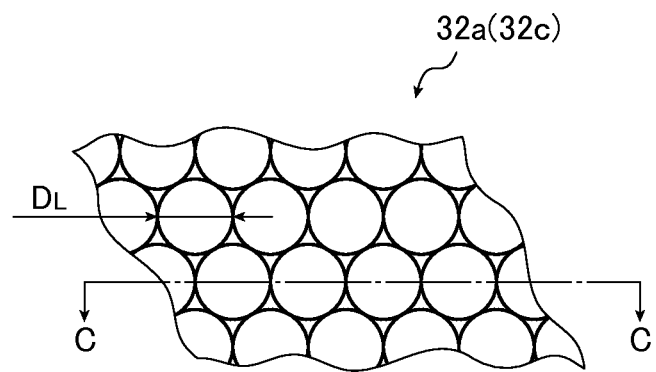
FIG. 7A is an enlarged diagram schematically showing part of a micro-lens film shown in FIG. 2
Figure 7B:
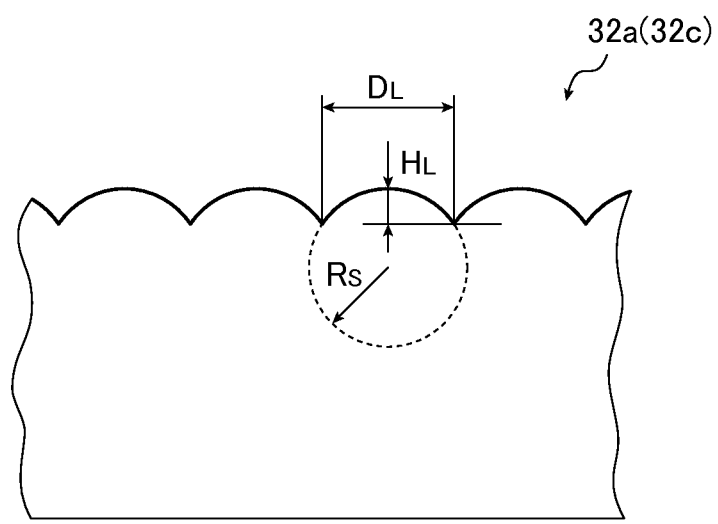
FIG. 7B is a cross-sectional view taken along line C-C of FIG. 7A.

FIG. 7A is an enlarged diagram schematically showing part of the micro-lens film 32a (32c) when seen from the direction perpendicular to the light exit surface and FIG. 7B is a cross-sectional view taken along line C-C of FIG. 7A.

As shown in FIGS. 7A and 7B, the micro-lens film 32a and the micro-lens film 32c are formed by arranging plural spherical micro-ball lenses on a transparent film in a closest packing manner and concentrate incident light in a direction perpendicular to the film.

Each micro-ball lens in the illustrated example is a micro lens with a spherical radius of $R_S$, a lens diameter of $D_L$, and a height of $H_L$.

Thus, the micro-lens films 32a and 32c are formed by arranging plural spherical micro-ball lenses on a film and concentrate incident light on a direction perpendicular to the film.

As in the illustrated light guide plate 30, in the light guide plate (backlight unit) in which scattering particles are kneaded and dispersed and which causes light to enter from a side surface of the light guide plate and causes light to exit from the front surface thereof, the light incidence direction and the light exit direction are different from each other by 90°, and light is scattered in the light guide plate to be guided to the exit direction. Here, the scattering of light by the scattering particles is forward scattering. Accordingly, illumination light emitted from the light exit surface 30a is emitted not only in the direction perpendicular to the light exit surface but also in various directions having angles relative to the direction perpendicular to the light exit surface 30a. Therefore, the front luminance (luminance in the direction perpendicular to the light exit surface) of outgoing light is likely to be lowered.

On the contrary, as in the illustrated backlight unit 20, since the optical member unit disposed to face the light exit surface 30a of the light guide plate 30 is configured to have the micro-lens film, it is possible to concentrate light emitted from the light exit surface 30a in various directions to the direction perpendicular to the light exit surface 30a, thereby improving luminance (front luminance) of illumination light emitted in the front direction of the backlight unit (direction perpendicular to the light exit surface 30a) and improving the light use efficiency.

In comparison with light guide plates formed through other methods such as printing, it is possible to more appropriately achieve improvement of front luminance by combining the light guide plate having the uniform angle distribution of outgoing light and scattering particles kneaded and dispersed therein with the micro-lens film having an effect of improving the front luminance.

Here, the diameter $D_L$ of the micro-ball lenses formed in the micro-lens films 32a and 32c preferably ranges from 10 µm to 100 µm. An interference effect is considered as negligible when the diameter $D_L$ of the micro-ball lenses is about 10 times the wavelength of a visible range. Accordingly, the diameter of the micro-ball lenses is preferably set to 10 µm or more which is 10 times or more the maximum wavelength 780 nm of the visible range. On the other hand, since the micro-ball lenses are likely to be visually recognized when the diameter thereof is large, the diameter of the micro-ball lenses is preferably set to 100 µm or less.

Thus, by setting the diameter $D_L$ of the micro-ball lenses to the range of 10 μm to 100 μm, it is possible to suitably concentrate illumination light emitted from the light exit surface 30a of the light guide plate 30 and entering the film, thereby improving the front luminance and the light use efficiency.

The height $H_L$ and the diameter $D_L$ of the micro-ball lenses preferably satisfy a relationship of $D_L/2 > H_L \geq D_L/8$. When the relationship of the height $H_L$ and the diameter $D_L$ satisfies $H_L \geq D_L/2$, the unevenness of the surface of the micro-lens film increases, which may cause insufficient mechanical strength. When the relationship of height $H_L$ and the diameter $D_L$ satisfies $H_L < D_L/8$, it may interfere with the wavelength of the visible range.

Thus, when the height $H_L$ and the diameter $D_L$ of the micro-ball lenses satisfy the relationship of $D_L/2 > H_L \geq D_L/8$, it is possible to suitably concentrate illumination light emitted from the light exit surface 30a of the light guide plate 30 and entering the film, thereby improving the front luminance and the light use efficiency.

The arrangement density of the micro-ball lenses is not particularly limited and can be determined depending on performance required for the device or the like. The front luminance of illumination light emitted from the backlight unit 20 can be modified by modifying the arrangement density of the micro-ball lenses. For example, when it is desired to increase the front luminance of illumination light emitted from the backlight unit 20, the micro-ball lenses are formed to arrange in the closest-packing manner to increase the amount of light concentrated in the direction perpendicular to the light incidence surfaces, thereby increasing the front luminance.

It is preferable that the micro-ball lenses be randomly arranged. The random arrangement of the micro-ball lenses can reduce occurrence of moire fringe or the like due to the structure of the micro-lens film.

Further, the surface roughness of the micro-ball lenses is preferably formed so that the root-mean-square inclination ZΔq is $0.1 \leq Z\Delta q \leq 7.5$. By setting the surface roughness of the micro-ball lenses to fall within this range to impart a diffusing property, light emitted from the light exit surface 30a and entering the film can be more concentrated in the direction perpendicular to the light exit surface 30a and it is thus possible to further improve the front luminance of illumination light emitted from the backlight unit 20 and the light use efficiency. In addition, since the front luminance can be further improved by setting the surface roughness of the micro-ball lenses to fall within this range to impart a diffusing property, the number of various optical sheets used in the optical member unit can be reduced, thereby reducing the costs.

The height $H_C$ of the unevenness of the surface roughness of the micro-ball lenses is preferably $0.78 \mu m \leq H_C \leq H_L/10$. In order to scatter light, the height $H_C$ of the unevenness is preferably larger than the maximum wavelength of 0.78 μm of the visible light. In consideration of the mechanical strength of the micro-lens film 32a (32c), the height $H_C$ of the unevenness is preferably equal to or less than 1/10 of the height $H_L$ of the micro-ball lenses.

As the method of roughening the surfaces of the micro-ball lenses, various known roughening methods such as a sandblasting method, a laser speckle pattern printing method, and an electrical discharge machining method can be used.

A lenticular lens film in which lenticular lenses are arranged in a line with their longitudinal directions extending in a predetermined direction may be used instead of the micro-ball lens film.

In the case of using the lenticular lens film, light entering the film is concentrated in the direction perpendicular to the light exit surface 30a in the direction perpendicular to the longitudinal direction of the lenticular lenses, and is not concentrated in the longitudinal direction of the lenticular lenses.

The prism sheet 32b is not particularly limited and known prism sheets can be used. For example, the prism sheet described in paragraphs [0028] to [0033] of JP 2005-234397 A by the applicant of the present invention can be used.

In this embodiment, the optical member unit is composed of two micro-lens films 32a and 32c and the prism sheet 32b disposed between the two micro-lens films 32a and 32c, but the optical member unit is not limited to this configuration. For example, the optical member unit may be composed of one micro-lens film and one prism sheet or may be composed of only one micro-lens film. An optical member to be combined with the micro-lens film is not particularly limited, and a diffusing sheet or a transmittance adjusting member in which many transmittance adjusters formed of diffuse reflectors are arranged depending on luminance unevenness and illuminance unevenness can be used in addition to or instead of the prism sheet.

Specifically, for example, when the backlight unit is used for an illumination or a sign, a micro-lens film alone can be used as an optical member unit instead of the diffusing sheet conventionally used. Alternatively, when the backlight unit is used as a backlight unit of a liquid crystal television/monitor, an optical member unit in which a micro-lens film, a prism sheet, and a luminance enhancement film are combined can be used. When the backlight unit is used as a backlight unit of a liquid crystal monitor of a notebook-sized PC or a mobile phone, an optical member unit in which a micro-lens film and a prism sheet are combined can be used.

Next, the reflecting plate 34 of the lighting device body 24 will be described below.

The reflecting plate 34 is disposed to reflect light leaking from the rear surface 30b of the light guide plate 30 to cause the light to enter the light guide plate 30 again, thereby improving the light use efficiency. The reflecting plate 34 is formed in a shape corresponding to the rear surface 30b of the light guide plate 30 so as to cover the rear surface 30b. In this embodiment, as shown in FIG. 2, since the rear surface 30b of the light guide plate 30 is a planar surface, that is, the cross-section thereof is formed in a linear shape, the reflecting plate 34 is also formed in a shape corresponding thereto.

The reflecting plate 34 may be formed of any material as long as it can reflect light leaking from the rear surface 30b of the light guide plate 30. For example, the reflecting plate 34 can be formed of a resin sheet in which voids are formed by kneading a filler in PET, PP (PolyPropylene), or the like and then stretching the resultant so as to enhance reflectance, a sheet in which a specular surface is formed on the surface of a transparent or white resin sheet through deposition of aluminum or the like, a metal foil of aluminum or the like or a resin sheet carrying a metal foil, or a thin metal sheet having a sufficient reflection property on the surface thereof.

Upper light guide reflecting plates 36 are disposed between the light guide plate 30 and the micro-lens film 32a, that is, on the side closer to the light exit surface 30a of the light guide plate 30, to cover the light source units 28 and the end portions of the light exit surface 30a of the light guide plate 30 (an end portion on the side closer to the first light incidence surface 30c and an end portion on the side closer to the second light incidence surface 30d). In other words, the upper light guide reflecting plates 36 are each disposed to cover from part of the light exit surface 30a of the light guide plate 30 to part of the light source support 52 of the light source unit 28 in the direction parallel to the optical axis direction. That is, the two upper light guide reflecting plates 36 are separately disposed at the respective end portions of the light guide plate 30.

By arranging the upper light guide reflecting plates 36 in this way, it is possible to prevent light emitted from the light source units 28 from leaking toward the light exit surface 30a without entering the light guide plate 30.

Accordingly, it is possible to cause light emitted from the light source units 28 to efficiently enter the first light incidence surface 30c and the second light incidence surface 30d of the light guide plate 30, thereby improving the light use efficiency.

Lower light guide reflecting plates 38 are disposed on the side closer to the rear surface 30b of the light guide plate 30 so as to cover part of the light source units 28. Ends of the lower light guide reflecting plates 38 close to the center of the light guide plate 30 are connected to the reflecting plate 34.

Here, the upper light guide reflecting plates 36 and the lower light guide reflecting plates 38 can be formed of various materials used in the reflecting plate 34.

By providing the lower light guide reflecting plates 38, it is possible to prevent light emitted from the light source units 28 from leaking from the rear surface 30b of the light guide plate 30 without entering the light guide plate 30.

Accordingly, it is possible to cause light emitted from the light source units 28 to efficiently enter the first light incidence surface 30c and the second light incidence surface 30d of the light guide plate 30, thereby improving the light use efficiency.

In this embodiment, the reflecting plate 34 is connected to the lower light guide reflecting plates 38, but the present invention is not limited to this configuration and the reflecting plate and the lower light guide reflecting plates may be formed as different members.

The upper light guide reflecting plate 36 and the lower light guide reflecting plates 38 are not particularly limited in shape and width, as long as they can reflect light emitted from the light source units 28 toward the first light incidence surface 30c or the second light incidence surface 30d, cause the light emitted from the light source units 28 to enter the first light incidence surface 30c or the second light incidence surface 30d, and guide the light entering the light guide plate 30 to the center of the light guide plate 30.

In this embodiment, the upper light guide reflecting plates 36 are disposed between the light guide plate 30 and the micro-lens film 32a, but the position of the upper light guide reflecting plates 36 is not limited thereto. The upper light guide reflecting plates 36 may be disposed between sheet-like members constituting the optical member unit 32 or may be disposed between the optical member unit 32 and the upper housing 44.

Next, the housing 26 will be described below.

As shown in FIG. 2, the housing 26 receives and supports the lighting device main body 24 and holds and secures the lighting device main body 24 from the side closer to the light exit surface 24a and the side closer to the rear surface 30b of the light guide plate 30. The housing 26 has the lower housing 42, the upper housing 44, the folded members 46, and the support members 48.

The lower housing 42 is open at the top and has a shape formed by a bottom section and lateral sections provided upright on four sides of the bottom section. In brief, the lower housing 42 has a substantially rectangular box shape of which one surface is open. As shown in FIG. 2, the lower housing 42 supports the lighting device main body 24 received therein from above on the bottom section and the lateral sections and covers the surfaces of the lighting device main body 24 other than the light exit surface 24a, that is, the opposite surface of the lighting device main body 24 to the light exit surface 24a (rear surface) and the lateral surfaces thereof.

The upper housing 44 has the shape of a rectangular box which has at the top a rectangular opening 44a smaller than the rectangular light exit surface 24a of the lighting device main body 24 and which is open at the bottom.

As shown in FIG. 2, the upper housing 44 is disposed to cover the lighting device main body 24 and the lower housing 42 receiving the main body, including the four lateral sections, from above the lighting device main body 24 and the lower housing 42 (i.e., from the light exit surface side).

The folded members 46 have a concave (U-shaped) sectional profile that is always identical throughout their length. That is, each of the folded members 46 is a rod-like member having a U-shape in a cross-section perpendicular to its extending direction.

As shown in FIG. 2, each folded member 46 is fitted between a side surface of the lower housing 42 and a side surface of the upper housing 44 so that the outer surface of one of the parallel portions of the U shape is joined to the side surface of the lower housing 42 and the outer surface of the other of the parallel portions is joined to the side surface of the upper housing 44.

Here, as a method of joining the folded members 46 to the lower housing 42 and a method of joining the folded members 46 to the upper housing 44, various known methods such as a method using bolts and nuts and a method using an adhesive can be used.

By disposing the folded members 46 between the lower housing 42 and the upper housing 44 in this way, it is possible to enhance the rigidity of the housing 26 to prevent the light guide plate 30 from being bent. Accordingly, for example, even when the light guide plate used is capable of efficiently emitting light with no luminance unevenness and no illuminance unevenness or with small luminance unevenness and small illuminance unevenness but is easily bent, it is possible to more reliably correct the bending or more reliably prevent the light guide plate from being bent, thereby emitting light with no luminance unevenness and no illuminance unevenness or with reduced luminance unevenness and reduced illuminance unevenness from the light exit surface.

Various materials such as metal and resin can be used for the upper housing, the lower housing, and the folded members of the housing. The material used preferably has small weight and high strength.

In this embodiment, the folded members are formed as independent members, but may be integrated with the upper housing or the lower housing. Alternatively, the folded members may not be provided.

The support members 48 are rod-like members having an identical shape in a cross-section perpendicular to its extending direction.

As shown in FIG. 2, the support members 48 are disposed between the lower housing 42 and the reflecting plate 34, more specifically between the lower housing 42 and the reflecting plate 34 at the positions corresponding to the ends of the rear surface 30b of the light guide plate 30 on the side closer to the first light incidence surface 30c and on the side closer to the second light incidence surface 30d. The support members 48 fix the light guide plate 30 and the reflecting plate 34 to the lower housing 42, and support them.

By supporting the reflecting plate 34 using the support members 48, it is possible to bring the light guide plate 30 into close contact with the reflecting plate 34. It is also possible to fix the light guide plate 30 and the reflecting plate 34 to the lower housing 42 at predetermined positions.

In this embodiment, the support members are provided as independent members, but the support member is not limited to this configuration and may be integrated with the lower housing 42 or the reflecting plate 34. That is, protruding portions may be formed in part of the lower housing 42 to be used as the support members, or protruding portions may be formed in part of the reflecting plate 34 to be used as the support members.

The positions of the support members are not particularly limited, and the support members can be disposed at any positions between the reflecting plate and the lower housing. However, in order to stably hold the light guide plate, the support members are preferably disposed on the sides closer to the ends of the light guide plate, that is, in the vicinities of the first light incidence surface 30c and the second light incidence surface 30d in this embodiment.

The shape of the support members 48 is not particularly limited, and the support members may have various shapes and may be formed of various materials. For example, plural support members may be arranged at predetermined intervals.

The support members may have a shape filling the entire space formed by the reflecting plate and the lower housing. That is, the surface on the side closer to the reflecting plate may have a shape corresponding to the reflecting plate and the surface on the side closer to the lower housing may have a shape corresponding to the lower housing. When the entire surface of the reflecting plate is supported by the support member in this way, it is possible to reliably prevent the light guide plate and the reflecting plate from being separated from each other and prevent occurrence of luminance unevenness and illuminance unevenness by light reflected by the reflecting plate.

The function of the backlight unit 20 configured as described above will be described.

In the backlight unit 20, light emitted from the light source units 28 disposed at both ends of the light guide plate 30 enters the light guide plate 30 through the light incidence surfaces (the first light incidence surface 30c and the second light incidence surface 30d). The light entering from the respective surfaces is scattered by the scattering material contained in the light guide plate 30 as the light travels inside the light guide plate 30 and is emitted from the light exit surface 30a directly or after being reflected by the rear surface 30b. At this time, a part of the light leaking from the rear surface is reflected by the reflecting plate 34 and enters the light guide plate 30 again.

In this way, the light emitted from the light exit surface 30a of the light guide plate 30 passes through the optical member unit 32 and is emitted from the light exit surface 24a of the lighting device main body 24, thereby illuminating the liquid crystal display panel 12.

The liquid crystal display panel 12 uses the drive unit 14 to control the light transmittance according to the position so as to display characters, figures, images and the like on the surface of the liquid crystal display panel 12.

In the above-mentioned embodiment, double-side incidence in which two light source units are separately disposed on two light incidence surfaces of the light guide plate is employed, but the present invention is not limited to this configuration, and single-side incidence in which only one light source unit is disposed on one light incidence surface of the light guide plate may be employed. By reducing the number of light source units, it is possible to reduce the number of components, thereby reducing costs.

In a case of employing the single-side incidence, a light guide plate in which the shape of the interface z is asymmetric may be used. For example, a light guide plate which has one light incidence surface and in which the shape of the second layer of the light guide plate is asymmetric such that the thickness of the second layer is the maximum at a position more distant from the light incidence surface than the bisector of the light exit surface may be used.

FIG. 8A is a schematic cross-sectional view showing another example of the backlight unit according to the present invention. The backlight unit 156 shown in FIG. 8A has the same configuration as the backlight unit 20, except that a light guide plate 150 is used instead of the light guide plate 30 and only one light source unit 28 is used. Accordingly, the same elements will be denoted by the same reference numerals and the differences will be mainly described below.

The backlight unit 156 shown in FIG. 8A comprises a light guide plate 150 and a light source unit 28 disposed to face a first light incidence surface 30c of the light guide plate 150.

The light guide plate 150 has a first light incidence surface 30c which is disposed to face the light source unit 28 and a side surface 150d which is the opposite surface of the first light incidence surface 30c.

The light guide plate 150 is formed of a first layer 152 on the side closer to a light exit surface 30a and a second layer 154 on the side closer to a rear surface 30b. The interface z between the first layer 152 and the second layer 154 continuously varies so that the thickness of the second layer 154 increases from the first light incidence surface 30c toward the side surface 150d, the thickness of the second layer 154 once decreases, and then the thickness of the second layer 154 increases again and decreases on the side closer to the side surface 150d, when seen in a cross-section perpendicular to the longitudinal direction of the first light incidence surface 30c.

Specifically, the interface z includes a curved surface convex to the light exit surface 30a on the side closer to the side surface 150d, a concave curved surface smoothly connected to the convex curved surface, and a concave curved surface connected to the concave curved surface and connected to the end of the light incidence surface 30c on the side closer to the rear surface 30b. The thickness of the second layer 154 is 0 on the light incidence surface 30c.

That is, the combined particle concentration of scattering particles (the thickness of the second layer) varies so as to have a first local maximum value in the vicinity of the first light incidence surface 30c and a second local maximum value larger than the first local maximum value on the side closer to the side surface 150d than the center of the light guide plate.

Although not shown in the drawing, the first local maximum value of the combined particle concentration of the light guide plate 150 is located at the edge of the opening of the housing, and the region from the light incidence surface 30c to the corresponding position of the first local maximum value is a so-called mixing zone M for diffusing light entering from the light incidence surface.

Thus, in a case of employing the single-side incidence using only one light source, the combined particle concentration (the thickness of the second layer 154) of the light guide plate 150 has the first local maximum value at the position close to the light incidence surface 30c and the second local maximum value larger than the first local maximum value on the side closer to the side surface 150d than the central portion. Accordingly, even in a large-size and thin light guide plate, light entering from the light incidence surface can be sent to a position further distant from the light incidence surface, whereby outgoing light can have the luminance distribution which is high in the middle.

In addition, by setting the position of the first local maximum value of the combined particle concentration to the vicinity of the light incidence surface, it is possible to sufficiently diffuse light entering from the light incidence surface in the vicinity of the light incidence surface, thereby preventing a visible bright line (dark line, unevenness) due to intervals of arranged light sources or the like from appearing in outgoing light emitted from the vicinity of the light incidence surface.

Moreover, by adjusting the combined particle concentration so that the region closer to the light incidence surface than the position where the combined particle concentration takes the first local maximum value has a lower combined particle concentration than the first local maximum value, it is possible to reduce return light, which is light emitted from the light incidence surface after it once enters the light guide plate, and outgoing light emitted through the region in the vicinity of the light incidence surface (mixing zone M) which is not used because the region is covered with the housing, thereby improving the use efficiency of light emitted through an effective region of the light exit surface (effective screen area E).

In the light guide plate 150 of the backlight unit 156 shown in FIG. 8A, the shape of the interface z in the mixing zone M is a curved surface concave to the light exit surface 30a which is connected to the end of the light incidence surface 30c on the side closer to the rear surface 30b, but the shape of the interface z is not limited thereto.

FIGS. 8B to 8F are schematic diagrams showing other examples of the backlight unit according to the present invention.

The backlight units 166, 176, 186, 196, and 206 shown in FIGS. 8B to 8F have the same configuration as the backlight unit 156 shown in FIG. 8A, except that the thicknesses of the first layer 152 and the second layer 154 in the mixing zone M of the light guide plate 150, that is, the shape of the interface z from the light incidence surface 30c to the position of the first local maximum value, are changed. Accordingly, the same elements will be denoted by the same reference numerals and the differences will be mainly described below.

A light guide plate 160 of the backlight unit 166 shown in FIG. 8B is composed of a first layer 162 and a second layer 164 having a particle concentration higher than that of the first layer 162. The shape of the interface z between the first layer 162 and the second layer 164 in the mixing zone M is a curved surface which is connected to the position of the first local maximum value, is convex to the light exit surface 30a, and is connected to the end of the light incidence surface 30c on the side closer to the rear surface 30b.

A light guide plate 170 of the backlight unit 176 shown in FIG. 8C is composed of a first layer 172 and a second layer 174 having a particle concentration higher than that of the first layer 172. The shape of the interface z between the first layer 172 and the second layer 174 in the mixing zone M is a planar surface which is connected to the position of the first local maximum value and to the end of the light incidence surface 30c on the side closer to the rear surface 30b.

A light guide plate 180 of the backlight unit 186 shown in FIG. 8D is composed of a first layer 182 and a second layer 184 having a particle concentration higher than that of the first layer 182. The shape of the interface z between the first layer 182 and the second layer 184 in the mixing zone M is a curved surface which is connected to the position of the first local maximum value, is convex to the light exit surface 30a, and is connected to the rear surface 30b substantially in the middle of the mixing zone M.

A light guide plate 190 of the backlight unit 196 shown in FIG. 8E composed of a first layer 192 and a second layer 194 having a particle concentration higher than that of the first layer 192. The shape of the interface z between the first layer 192 and the second layer 194 in the mixing zone M is a curved surface which is connected to the position of the first local maximum value, is concave to the light exit surface 30a, and is connected to the rear surface 30b substantially in the middle of the mixing zone M.

A light guide plate 200 of the backlight unit 206 shown in FIG. 8F is composed of a first layer 202 and a second layer 204 having a particle concentration higher than that of the first layer 202. The light guide plate 200 in the mixing zone M has only the first layer 202. That is, the shape of the interface z is formed to have a planar surface which passes through the position of the first local maximum and is parallel to the light incidence surface 30c.

As in the light guide plates shown in FIGS. 8B to 8F, the shape of the interface z is formed so that the thickness of the second layer decreases from the position of the first local maximum value toward the light incidence surface 30c. Accordingly, since the combined particle concentration of the region from the position of the first local maximum value to the light incidence surface 30c (mixing zone M) can be adjusted to a combined particle concentration lower than the first local maximum value, it is possible to reduce return light, which is light emitted from the light incidence surface after it once enters the light guide plate, and outgoing light emitted from the region (mixing zone M) in the vicinity of the light incidence surface which is not used because the region is covered with the housing, thereby improving the use efficiency of light emitted from the effective region of the light exit surface (effective screen area E).

The shape of the interface z in the effective screen area E of the light guide plate 150 shown in FIG. 8A is formed so that the thickness of the second layer 154 once decreases from the position of the first local maximum value toward the side surface 150d, then increases to the second local maximum value, and decreases again, but the present invention is not limited thereto.

Figure 9:
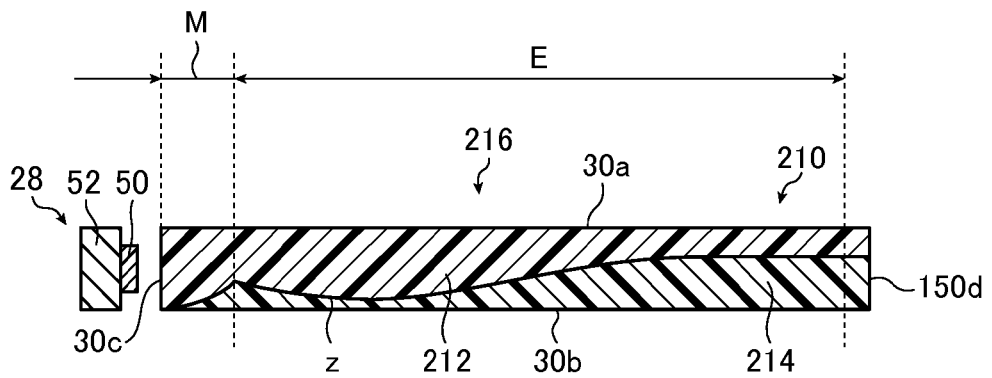
FIG. 9 is a schematic cross-sectional view showing another example of the planar lighting device according to the present invention.

FIG. 9 is a schematic diagram showing another example of the backlight unit according to the present invention.

A backlight unit 216 shown in FIG. 9 has the same configuration as the backlight unit 156 shown in FIG. 8A, except that the thicknesses of the first layer 152 and the second layer 154 in the effective screen area E of the light guide plate 150, that is, the shape of the interface z from the position of the first local maximum value to the vicinity of the side surface 150d, are changed. Accordingly, the same elements will be denoted by the same reference numerals and the differences will be mainly described below.

A light guide plate 210 of the backlight unit 216 shown in FIG. 9 is composed of a first layer 212 and a second layer 214 having a particle concentration higher than that of the first layer 212. The interface z between the first layer 212 and the second layer 214 in the effective screen area E has a shape in which the thickness of the second layer 214 once decreases from the position of the first local maximum value toward the side surface 150d, then increases to the second local maximum value, and is constant all the way to the side surface 150d.

Thus, since the shape of the interface z is made asymmetric by combining curved surfaces and planar surfaces so that in the effective screen area E, the combined particle concentration of scattering particles is the minimum at the position close to the light incidence surface and is the maximum at the position distant from the light incidence surface, it is possible to guide light emitted from the light source and entering from the light incidence surface to a deep part of the light guide plate, thereby obtaining a favorable luminance distribution and improving the light use efficiency.

In the light guide plate of single-side incidence shown in FIG. 8A, the rear surface is a planar surface parallel to the traveling direction of light (light exit surface), but the present invention is not limited to this configuration and the rear surface may be a planar surface inclined relative to the traveling direction of light.

Figure 10:
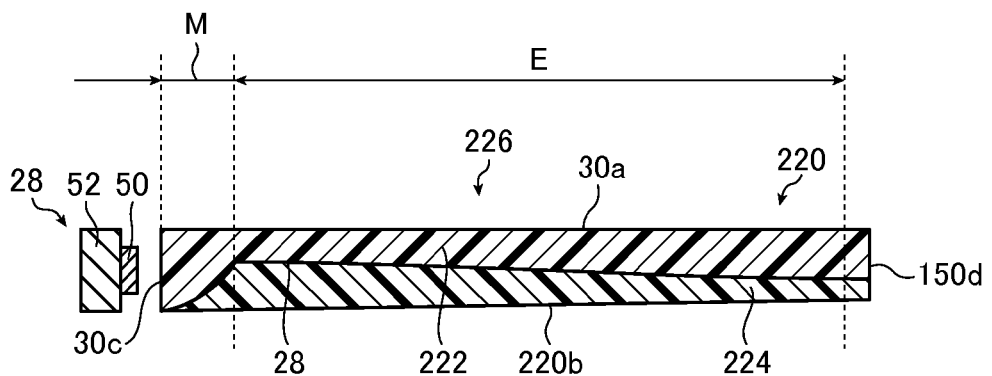
FIG. 10 is a schematic cross-sectional view showing another example of the planar lighting device according to the present invention.

FIG. 10 is a schematic diagram showing another example of the backlight unit according to the present invention.

A backlight unit 226 shown in FIG. 10 has the same configuration as the backlight unit 156 shown in FIG. 8A, except that the rear surface 30b of the light guide plate 150 is inclined relative to the light exit surface 30a and the thicknesses of the first layer 152 and the second layer 154 in the effective screen area E of the light guide plate 150, that is, the shape of the interface z from the position of the first local maximum value to the vicinity of the side surface 150d, are changed. Accordingly, the same elements will be denoted by the same reference numerals and the differences will be mainly described below.

The backlight unit 226 shown in FIG. 10 comprises a light guide plate 220 and a light source unit 28 disposed to face a first light incidence surface 30c of the light guide plate 220.

A rear surface 220b of the light guide plate 220 is inclined relative to the light exit surface 30a so that the thickness in the direction perpendicular to the light exit surface 30a decreases with increasing distance from the light incidence surface 30c.

The light guide plate 220 is composed of a first layer 222 and a second layer 224 having a particle concentration higher than that of the first layer 222. The interface z between the first layer 222 and the second layer 224 in the effective screen area E continuously varies so that the thickness of the second layer 224 once increases and then decreases as it gets closer to the side surface 150d, when seen in a cross-section perpendicular to the longitudinal direction of the first light incidence surface 30c.

Thus, since the rear surface 220b is inclined in a direction in which the thickness of the light guide plate decreases with increasing distance from the light incidence surface 30c, the amount of light emitted from the position distant from the light incidence surface 30c can be increased. By adjusting the shape of the interface z according to the above configuration to modify the combined particle concentration, it is possible to guide light entering from the light incidence surface to a deep part of the light guide plate, thereby obtaining a favorable luminance distribution and improving light use efficiency.

The backlight unit according to the present invention is also not limited to this configuration, and in addition to two light source units, another light source unit may be disposed to face a side surface of short side of the light exit surface of the light guide plate. The increase in the number of light source units can enhance the intensity of light emitted from the device.

Light may be emitted from the rear surface as well as the light exit surface.

The light guide plates in the shown examples are composed of two layers having different particle concentrations of scattering particles, but the present invention is not limited to this configuration, and the light guide plate may be composed of three or more layers having different particle concentrations of scattering particles.

The backlight unit in the shown example has the optical member unit 32 comprising two micro-lens films and one prism sheet, but the present invention is not limited to this configuration.

Figure 11:
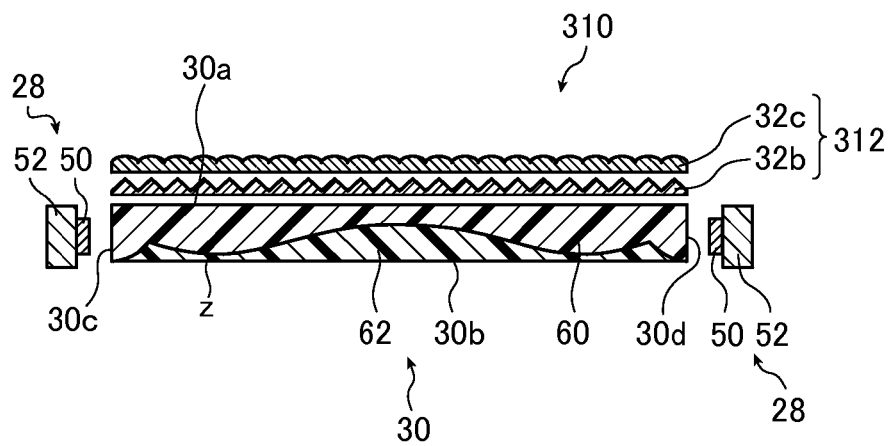
FIG. 11 is a schematic cross-sectional view showing another example of the planar lighting device according to the present invention.

FIG. 11 is a schematic diagram partially showing an example of the backlight unit according to the present invention using another optical member unit. The backlight unit 310 shown in FIG. 11 has the same configuration as the backlight unit 20, except that an optical member unit 312 is used instead of the optical member unit 32. Accordingly, the same elements will be reference by the same reference numerals and the differences will be mainly described below.

The backlight unit 310 shown in FIG. 11 comprises light source units 28, a light guide plate 30, and an optical member unit 312. The optical member unit 312 comprises a prism sheet 32b disposed to face the light exit surface 30a of the light guide plate 30 and a micro-lens film 32c disposed to face the surface of the prism sheet 32b on the side of emitting light. Light emitted from the light exit surface 30a sequentially passes through the prism sheet 32b and the micro-lens film 32c and is emitted from the light exit surface of the lighting device body.

Thus, even in the configuration in which the optical member unit has one micro-lens film, it is possible to concentrate light in the direction perpendicular to the light exit surface 30a, thereby improving front luminance of illumination light.

EXAMPLES

The present invention will be described in more detail below with reference to specific examples of the present invention.

Example 1

In Example 1, an illuminance distribution and a luminance distribution of outgoing light emitted from a light exit surface were calculated through computer simulation using a light guide plate having the interface z shown in FIG. 3B.

In the simulation, a model was formed using PMMA as the material of the transparent resin of the light guide plate and using silicon as the material of scattering particles. The same applies to all the following examples.

In Example 1, the light guide plate 30 corresponding to a screen size of 40 inches was used. Specifically, the light guide plate in which the length from the first light incidence surface 30c to the second light incidence surface 30d was 539 mm, the thickness of the light guide plate 30 was 1.5 mm, the thickness of the second layer 62 at the bisector α, that is, the thickness of the second layer 62 at the position of the second local maximum value, was 0.75 mm, the thickness of the second layer 62 at the positions of the first local maximum value was 0.3 mm, the thickness of the second layer 62 at the positions at which it is the smallest between the positions of the first local maximum value and the position of the second local maximum value was 0.25 mm, and the distance from the positions of the first local maximum value to their corresponding light incidence surface was 20 mm was used. The particle diameter of scattering particles kneaded and dispersed in the light guide plate was 4.5 μm, the particle concentration Npo of the first layer 60 was 0.02 wt % and the particle concentration Npr of the second layer 62 was 0.2 wt %.

The illuminance distribution and the luminance distribution were measured using the light guide plate having the above-mentioned shape. At that time, in order to understand the effects of the present invention, the illuminance distribution and the luminance distribution of the case where light was caused to enter only from one light incidence surface were also measured.

Figure 12A:
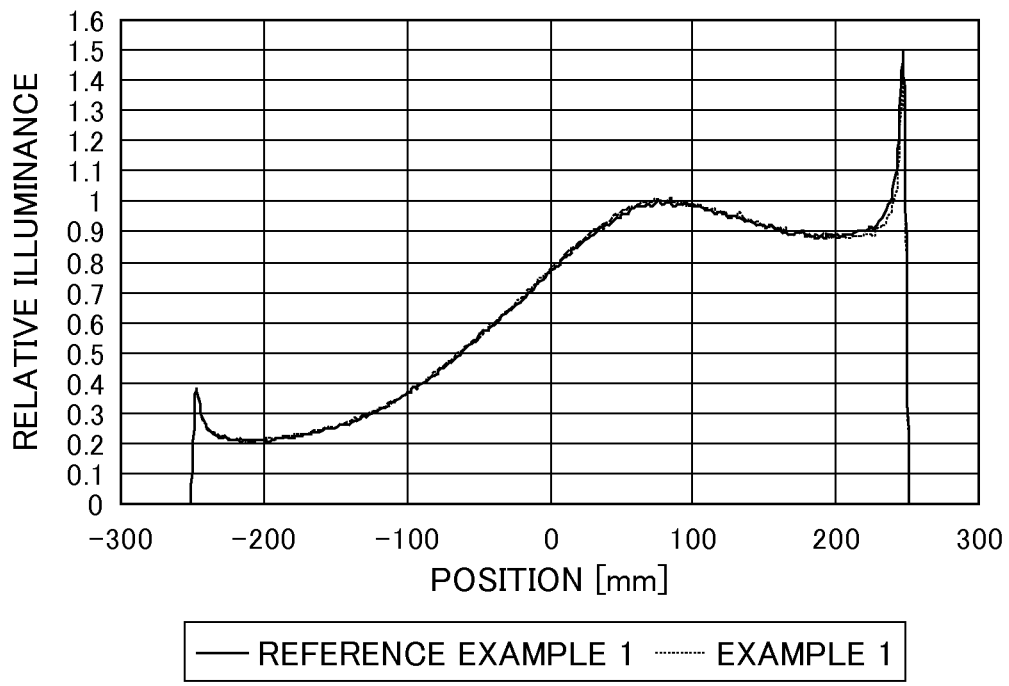
FIG. 12A is a graph showing measurement results of illuminance distributions of light emitted from a light exit surface of a light guide plate and FIG. 12B is a graph showing measurement results of luminance distributions of light emitted from the light exit surface of the light guide plate.
Figure 12B:
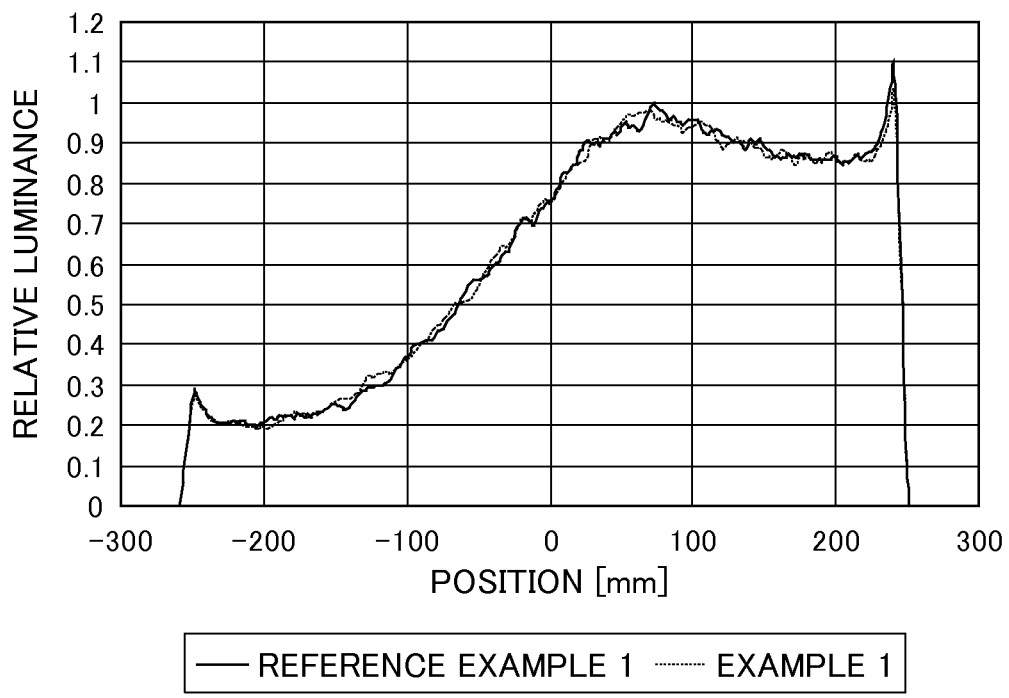
Figure 13A:
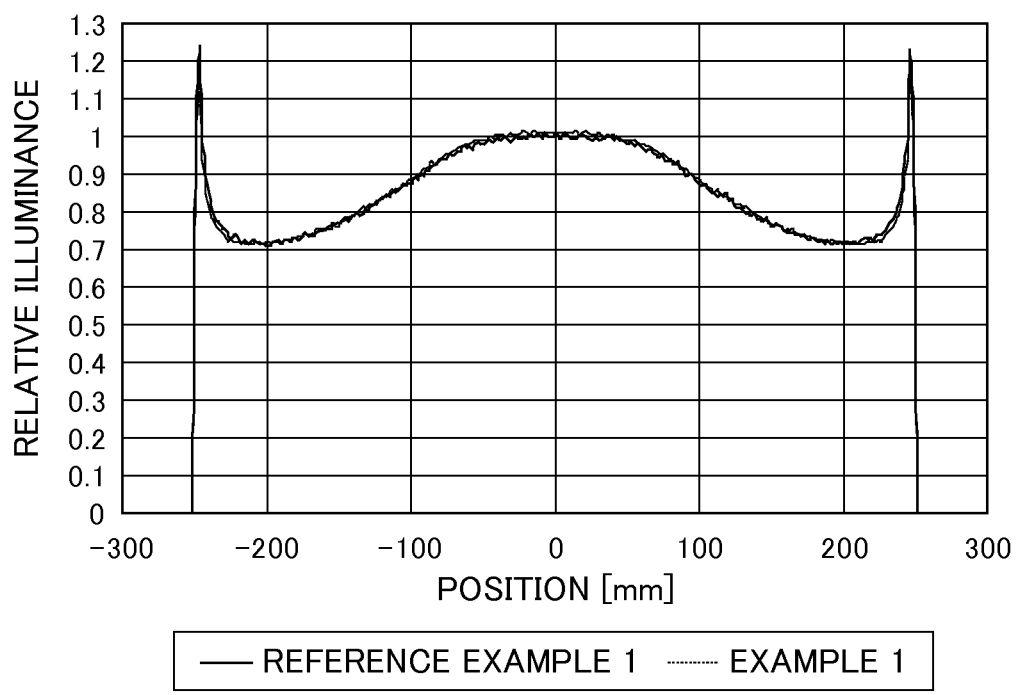
FIG. 13A is a graph showing measurement results of illuminance distributions of light emitted from the light exit surface of the light guide plate and FIG. 13B is a graph showing measurement results of luminance distributions of light emitted from the light exit surface of the light guide plate.
Figure 13B:
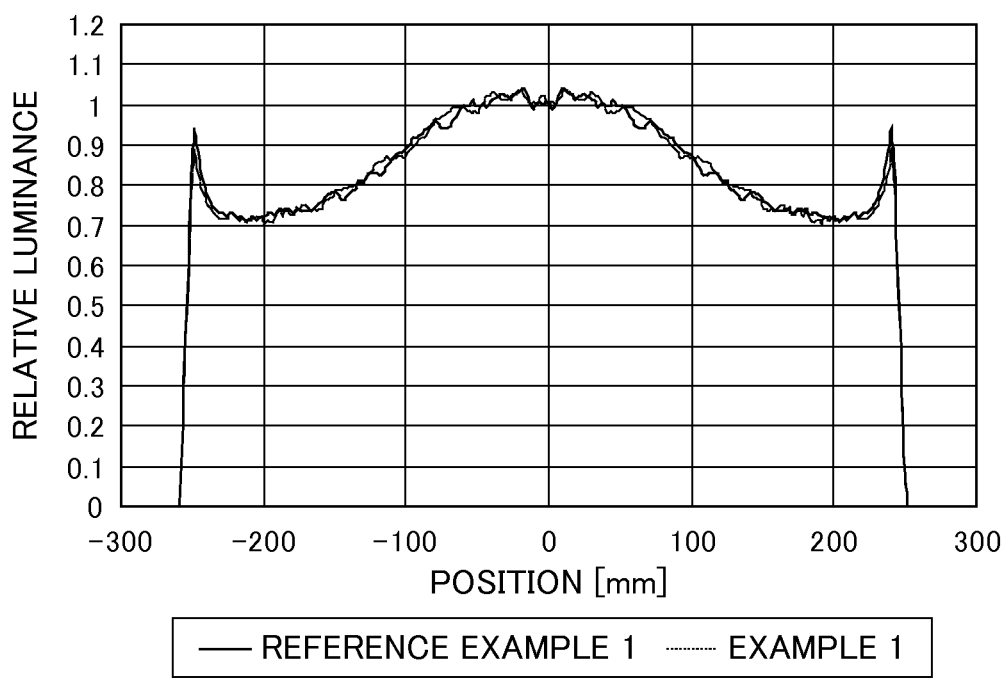

The measured illuminance distributions and the measured luminance distributions are shown in FIGS. 12A and 12B (single-side incidence) and FIGS. 13A and 13B (double-side incidence). In FIGS. 12A and 13A, the vertical axis represents the relative illuminance and the horizontal axis represents the distance [mm] from the center of the light guide plate. In FIGS. 12B and 13B, the vertical axis represents the relative luminance and the horizontal axis represents the distance [mm] from the center of the light guide plate. Example 1 is indicated by a dotted line and Reference Example 1 is indicated by a solid line.

Figure 17:
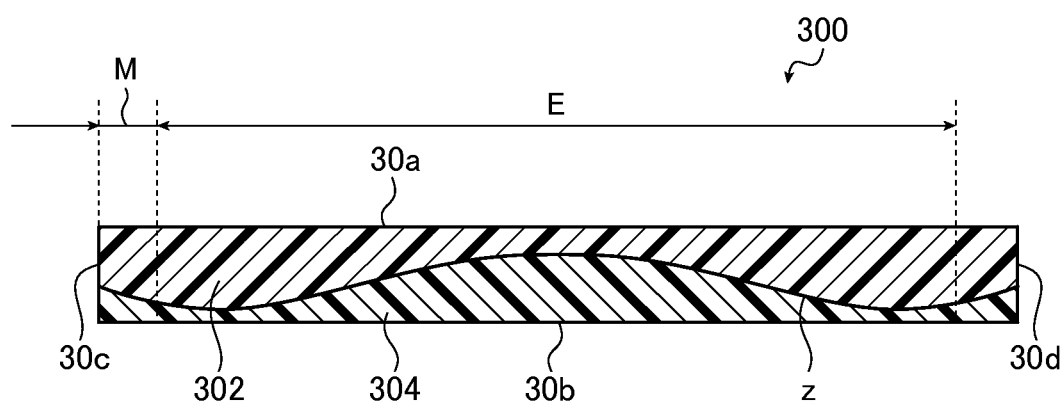
FIG. 17 is a schematic cross-sectional view showing another example of the light guide plate.

In Reference Example 1, a light guide plate 300 having the shape shown in FIG. 17 was used. In the light guide plate 300 shown in FIG. 17, the interface z between a first layer 302 and a second layer 304 having a particle concentration higher than that of the first layer 302 continuously varies so that the thickness of the second layer 304 decreases from the center of the light guide plate 300 toward the light incidence surfaces 30c and 30d and increases in the vicinities of the light incidence surfaces 30c and 30d.

As shown in FIGS. 12A and 12B and FIGS. 13A and 13B, in the light guide plate 30 according to Example 1, the illuminance and the luminance decrease at the positions immediately near the light incidence surfaces, that is, at the positions corresponding to the mixing zones M, and the illuminance and the luminance increase in the central region of the light guide plate, that is, at the position corresponding to the effective screen area E, as compared to the light guide plate 300 having the shape shown in FIG. 17.

The illuminance and the luminance can be thus enhanced in the effective screen area E, thereby improving the light use efficiency.

Example 2

In Example 2, an illuminance distribution and a luminance distribution of outgoing light emitted from a light exit surface were calculated through computer simulation using the light guide plate having the interface z shown in FIG. 6D.

The light guide plate 130 corresponding to a screen size of 40 inches was used in Example 2. Specifically, the light guide plate in which the length from the first light incidence surface 30c to the second light incidence surface 30d was 539 mm, the thickness of the light guide plate 130 was 1.5 mm, the thickness of the second layer 134 at the bisector α, that is, the thickness of the second layer 134 at the position of the second local maximum value, was 0.75 mm, the thickness of the second layer 134 at the positions of the first local maximum value was 0.25 mm, the thickness of the second layer 134 at the positions at which it is the smallest between the positions of the first local maximum value and the position of the second local maximum value was 0.2 mm, and the distance from the positions of the first local maximum value to the corresponding light incidence surface was 20 mm was used. The particle diameter of scattering particles kneaded and dispersed in the light guide plate was 4.5 µm, the particle concentration Npo of the first layer 132 was 0.02 wt % and the particle concentration Npr of the second layer 134 was 0.2 wt %.

The illuminance distribution and the luminance distribution were measured using the light guide plate having the above-mentioned shape. At that time, in order to understand the effects of the present invention, the illuminance distribution and the luminance distribution of the case where light was caused to enter only from one light incidence surface were also measured.

Figure 14A:
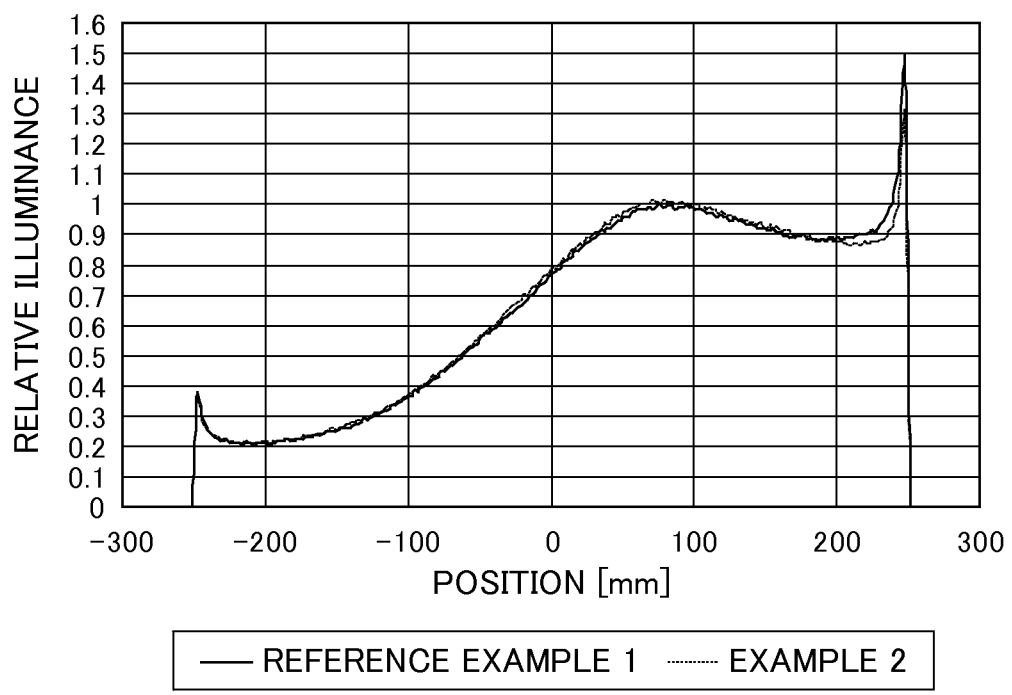
FIG. 14A is a graph showing measurement results of illuminance distributions of light emitted from the light exit surface of the light guide plate and FIG. 14B is a graph showing measurement results of luminance distributions of light emitted from the light exit surface of the light guide plate.
Figure 14B:
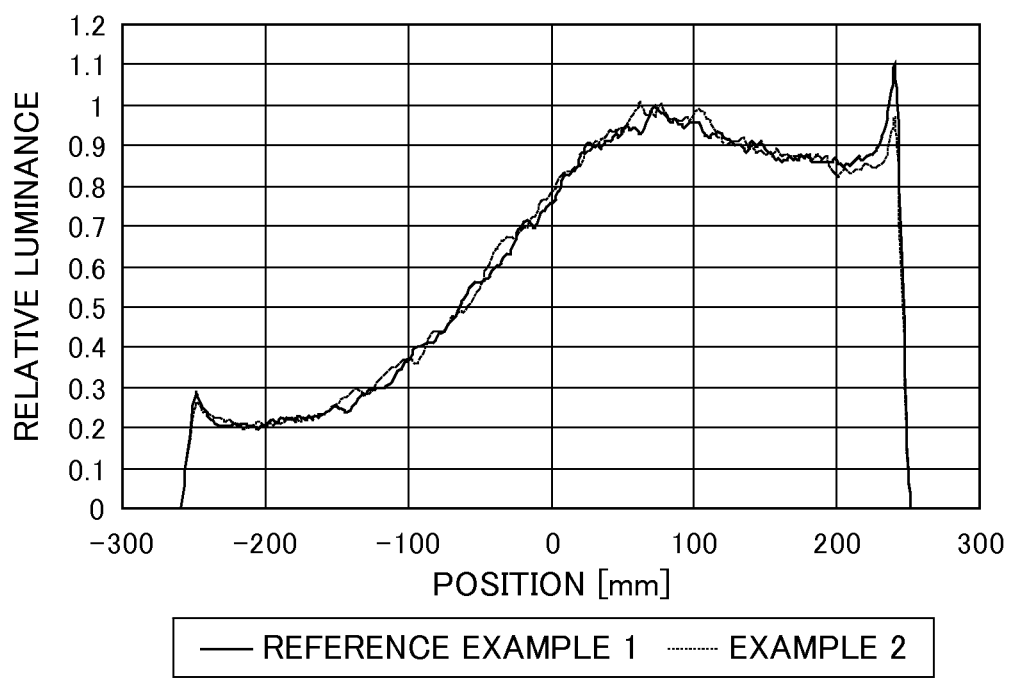
Figure 15A:
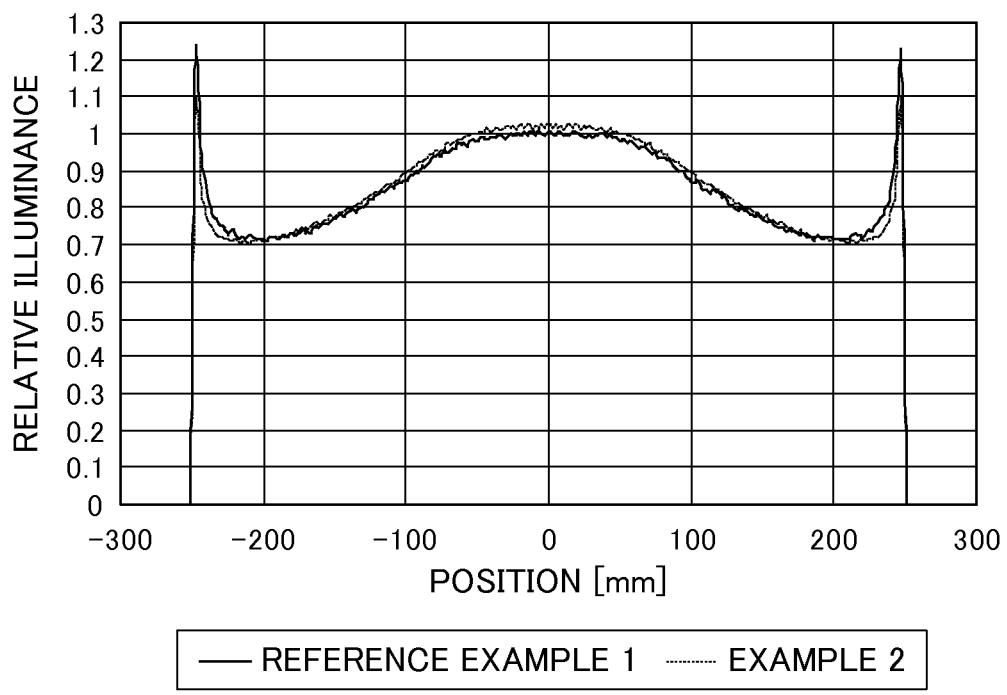
FIG. 15A is a graph showing measurement results of illuminance distributions of light emitted from the light exit surface of the light guide plate and FIG. 15B is a graph showing measurement results of luminance distributions of light emitted from the light exit surface of the light guide plate.
Figure 15B:
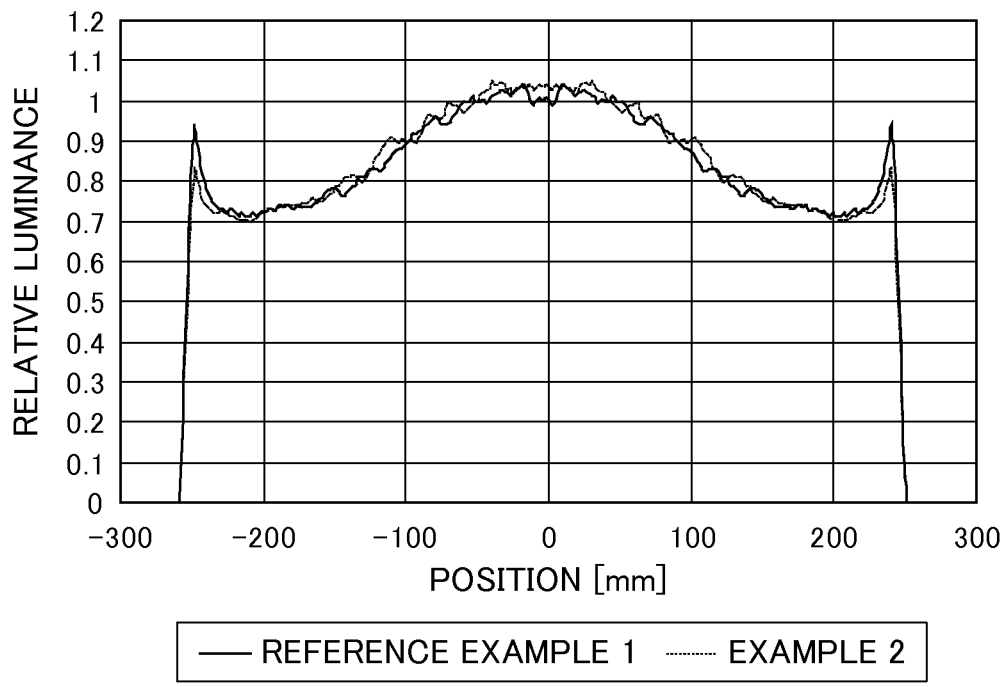

The measured illuminance distributions and the measured luminance distributions are shown in FIGS. 14A and 14B (single-side incidence) and FIGS. 15A and 15B (double-side incidence). In FIGS. 14A and 15A, the vertical axis represents the relative illuminance and the horizontal axis represents the distance [mm] from the center of the light guide plate. In FIGS. 14B and 15B, the vertical axis represents the relative luminance and the horizontal axis represents the distance [mm] from the center of the light guide plate. Example 2 is indicated by a dotted line and Reference Example 1 is indicated by a solid line.

As shown in FIGS. 14A and 14B and FIGS. 15A and 15B, in the light guide plate 130 according to Example 2, the illuminance and the luminance decrease at the positions immediately near the light incidence surfaces, that is, at the positions corresponding to the mixing zones M, and the illuminance and the luminance increase in the central region of the light guide plate, that is, at the position corresponding to the effective screen area E, as compared to the light guide plate 300 having the shape shown in FIG. 17.

The illuminance and the luminance can be thus enhanced in the effective screen area E, thereby improving the light use efficiency.

Example 3

Next, in Example 3, an angle distribution of outgoing light emitted from a backlight unit with a variously-changed optical member unit was calculated.

Specifically, the backlight unit 310 shown in FIG. 11 was used.

In Example 3-1, the same light guide plate 30 as in Example 1 was used as the light guide plate.

A prism sheet with a prism pitch of 50 µm, a thickness of 200 µm, and a prism vertex angle of 90° was used as the prism sheet 32b of the optical member unit 312.

A micro-lens film with a thickness of 200 µm in which micro-ball lenses with a diameter $D_L$ of 60 and a height $H_L$ of 30 µm were arranged in a closest-packing manner was used as the micro-lens film 32c.

Example 3-2 was the same as Example 3-1, except that the optical member unit has a diffusing sheet in addition to the optical member unit 312 and the height $H_L$ of the micro-lenses of the micro-lens film 32c is 4.8 µm. A diffusing sheet with total light transmittance of about 90%, a haze value of about 90%, and a thickness of 221 µm was used as the diffusing sheet.

Comparative Example 3-1 was the same as Example 3-1, except that an optical member unit having two diffusing sheets and a prism sheet was used instead of the optical member unit 312. A diffusing sheet with total light transmittance of about 90%, a haze value of about 90%, and a thickness of 221 µm was used as the diffusing sheet.

In the backlight units according to Examples 3-1 and 3-2 and Comparative Example 3-1, the angle distributions of outgoing light were calculated. Specifically, the intensities corresponding to angles of outgoing light emitted from a region with a diameter of Φ1 mm at the center of the light exit surface of the backlight unit (lighting device main body) were calculated in the direction perpendicular to the light incidence surface 30c of the light guide plate 30 (vertical direction) and in the direction parallel to the longitudinal direction of the light incidence surface (horizontal direction).

Figure 16A:
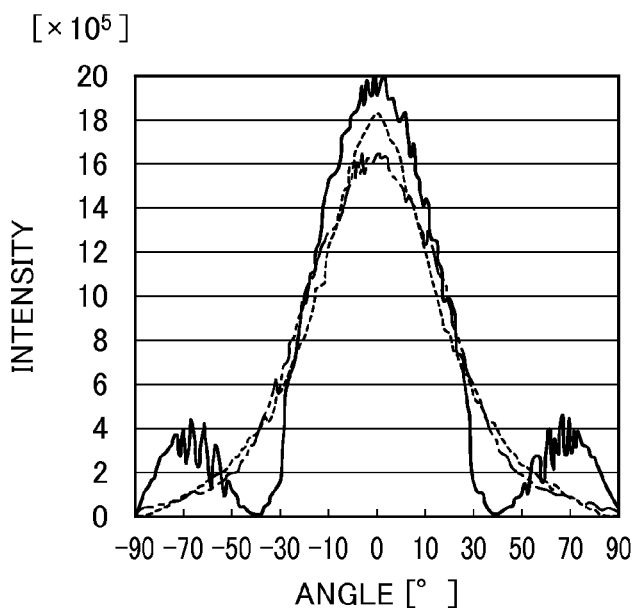
FIG. 16A and FIG. 16B are graphs showing angle distributions of intensity of light emitted from a planar lighting device.
Figure 16B:
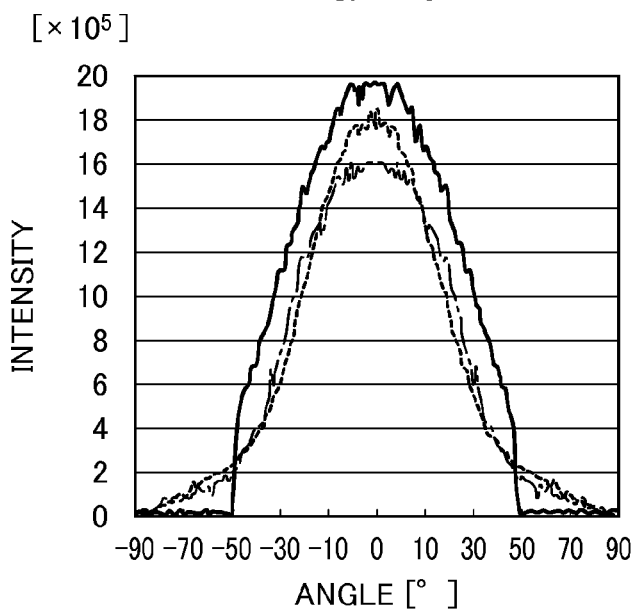

The measured angle distributions are shown in FIGS. 16A (vertical direction) and FIG. 16B (horizontal direction). In FIGS. 16A and 16B, the vertical axis represents the light intensity (relative luminance) and the horizontal axis represents the angle [°] with respect to the direction perpendicular to the light exit surface. Example 3-1 is indicated by a solid line, Example 3-2 is indicated by a dashed line, and Comparative Example 3-1 is indicated by a long dashed short dashed line.

In Table 1, the average value of light intensity in a region within a range of ±2° and the ratio thereof to the value of Comparative Example 3-1 are shown.

TABLE 1

|  | Intensity (×10$^5$) | Ratio (%) |
|---|---|---|
| Example 3-1 | 19.6 | 118 |
| Example 3-2 | 18.7 | 113 |
| Comparative Example 3-1 | 16.6 | 100 |

As shown in FIGS. 16A and 16B and Table 1, the backlight units according to Examples 3-1 and 3-2 each including the optical member unit having the micro-ball lens film were more improved in light intensity in the vicinity of 0° as compared to the backlight unit according to Comparative Example 3-1 not having the micro-lens film. Thus, by configuring the optical member unit to have the micro-lens film, light emitted in various directions from the light exit surface 30a can be concentrated in the direction perpendicular to the light exit surface 30a, thereby improving the front luminance of illumination light emitted from the backlight unit to improve the light use efficiency.

The relationship between the height $H_L$ and the diameter $D_L$ of the micro-ball lenses of the micro-lens film will be described in detail with reference to examples.

Example 4

As Example 4, in the case where the optical member unit was composed of only the micro-lens film, the shape of the micro-ball lenses of the micro-lens film was variously changed and the front luminous intensity of outgoing light emitted from the backlight unit was calculated by computer simulation.

Specifically, the same light guide plate 30 as in Example 1 was used as the light guide plate.

The optical member unit was configured to be composed of the micro-lens film.

In the micro-lens film, the diameter $D_L$ of the micro-ball lenses when seen from the direction perpendicular to the light exit surface thereof was 60 μm, the pitch of the micro-ball lenses was 60 μm (closest-packing), and the surface of the micro-lens film was a specular surface (mirror surface).

In Example 4-1, the height $H_L$ was 30 μm and the ratio $H_L/D_L$ of the height $H_L$ to the diameter $D_L$ was 0.5.

In Example 4-2, the height $H_L$ was 25 μm and the ratio $H_L/D_L$ was 0.42.

In Example 4-3, the height $H_L$ was 20 μm and the ratio $H_L/D_L$ was 0.33.

In Example 4-4, the height $H_L$ was 15 μm and the ratio $H_L/D_L$ was 0.25.

In Example 4-5, the height $H_L$ was 10 μm and the ratio $H_L/D_L$ was 0.17.

In Example 4-6, the height $H_L$ was 4.8 μm and the ratio $H_L/D_L$ was 0.08

The backlight units including the micro-lens film in which the height $H_L$ of the micro-ball lenses was variously changed as described above were subjected to simulation and the front luminous intensities were measured.

The measured front light intensities are shown in Table 2. Here, the front luminous intensity was expressed as a ratio to the front luminous intensity in Example 4-1 which was defined as 100.

TABLE 2

|  | $H_L/D_L$ | Front luminous intensity |
|---|---|---|
| Example 4-1 | 0.5 | 100 |
| Example 4-2 | 0.42 | 101 |
| Example 4-3 | 0.3 | 96 |
| Example 4-4 | 0.25 | 88 |
| Example 4-5 | 0.17 | 83 |
| Example 4-6 | 0.08 | 81 |

As shown in Table 2, when the optical member unit includes only the micro-lens film, it is preferable that the ratio of the height $H_L$ to the diameter $D_L$ ($H_L/D_L$) of the micro-ball lenses be equal to or more than 0.42 and less than 0.5.

Example 5

As Example 5, in the case where the optical member unit was composed of the micro-lens film and the prism sheet, the shape of the micro-ball lenses of the micro-lens film was variously changed and the front luminous intensity of outgoing light emitted from the backlight unit was calculated by computer simulation.

Specifically, this example was the same as in Example 4, except that the prism sheet was disposed on the side closer to the light exit surface of the micro-lens film.

A prism sheet with a prism pitch of 50 a thickness of 200 μm, and a prism vertex angle of 90° was used as the prism sheet.

In Example 5-1, the height $H_L$ was 30 μm and the ratio $H_L/D_L$ was 0.5.

In Example 5-2, the height $H_L$ was 25 μm and the ratio $H_L/D_L$ was 0.42.

In Example 5-3, the height $H_L$ was 20 μm and the ratio $H_L/D_L$ was 0.33.

In Example 5-4, the height $H_L$ was 15 μm and the ratio $H_L/D_L$ was 0.25.

In Example 5-5, the height $H_L$ was 10 μm and the ratio $H_L/D_L$ was 0.17.

In Example 5-6, the height $H_L$ was 4.8 μm and the ratio $H_L/D_L$ was 0.08

The backlight units including the micro-lens film in which the height $H_L$ of the micro-ball lenses was variously changed as described above were subjected to simulation and the front luminous intensities were measured.

The measured front light intensities are shown in Table 3. Here, the front luminous intensity was expressed as a ratio to the front luminous intensity in Example 5-1 which was defined as

TABLE 3

|  | $H_L/D_L$ | Front luminous intensity |
|---|---|---|
| Example 5-1 | 0.5 | 100 |
| Example 5-2 | 0.42 | 102 |
| Example 5-3 | 0.3 | 110 |
| Example 5-4 | 0.25 | 113 |
| Example 5-5 | 0.17 | 106 |
| Example 5-6 | 0.08 | 82 |

As shown in Table 3, when the optical member unit includes the micro-lens film and the prism sheet, it is preferable that the ratio of the height $H_L$ to the diameter $D_L$ ($H_L/D_L$) of the micro-ball lenses be equal to or more than 0.17 and less than 0.5.

Example 6

As Example 6, in the case where the optical member unit was composed of the micro-lens film and the diffusing sheet, the shape of the micro-ball lenses of the micro-lens film was variously changed and the front luminous intensity of outgoing light emitted from the backlight unit was calculated by computer simulation.

Specifically, this example was the same as in Example 4, except that the diffusing sheet was disposed on the side closer to the light exit surface of the micro-lens film.

A diffusing sheet with total light transmittance of about 90%, a haze value of about 90%, and a thickness of 221 μm was used as the diffusing sheet.

In Example 6-1, the height $H_L$ was 30 μm and the ratio $H_L/D_L$ was 0.5.

In Example 6-2, the height $H_L$ was 25 μm and the ratio $H_L/D_L$ was 0.42.

In Example 6-3, the height $H_L$ was 20 μm and the ratio $H_L/D_L$ was 0.33.

In Example 6-4, the height $H_L$ was 15 μm and the ratio $H_L/D_L$ was 0.25.

In Example 6-5, the height $H_L$ was 10 μm and the ratio $H_L/D_L$ was 0.17.

In Example 6-6, the height $H_L$ was 4.8 μm and the ratio $H_L/D_L$ was 0.08.

The backlight units including the micro-lens film in which the height $H_L$ of the micro-ball lenses was variously changed as described above were subjected to simulation and the front luminous intensities were measured.

The measured front light intensities are shown in Table 4. Here, the front luminous intensity was expressed as a ratio to the front luminous intensity in Example 6-1 which was defined as 100.

TABLE 4

| | $H_L/D_L$ | Front luminous intensity |
|---|---|---|
| Example 6-1 | 0.5 | 100 |
| Example 6-2 | 0.42 | 103 |
| Example 6-3 | 0.3 | 103 |
| Example 6-4 | 0.25 | 99 |
| Example 6-5 | 0.17 | 95 |
| Example 6-6 | 0.08 | 90 |

As shown in Table 4, when the optical member unit includes the micro-lens film and the diffusing sheet, it is preferable that the ratio of the height $H_L$ to the diameter $D_L$ ($H_L/D_L$) of the micro-ball lenses be equal to or more than 0.3 and less than 0.5.

Example 7

As Example 7, in the case where the optical member unit was composed of the micro-lens film, the prism sheet, and the diffusing sheet, the shape of the micro-ball lenses of the micro-lens film was variously changed and the front luminous intensity of outgoing light emitted from the backlight unit was calculated by computer simulation.

Specifically, this example was the same as in Example 5, except that the diffusing sheet was disposed on the side closer to the light exit surface of the prism sheet.

A diffusing sheet with total light transmittance of about 90%, a haze value of about 90%, and a thickness of 221 μm was used as the diffusing sheet.

In Example 7-1, the height $H_L$ was 30 μm and the ratio $H_L/D_L$ was 0.5.

In Example 7-2, the height $H_L$ was 25 μm and the ratio $H_L/D_L$ was 0.42.

In Example 7-3, the height $H_L$ was 20 μm and the ratio $H_L/D_L$ was 0.33.

In Example 7-4, the height $H_L$ was 15 μm and the ratio $H_L/D_L$ was 0.25.

In Example 7-5, the height $H_L$ was 10 μm and the ratio $H_L/D_L$ was 0.17.

In Example 7-6, the height $H_L$ was 4.8 μm and the ratio $H_L/D_L$ was 0.08.

The backlight units including the micro-lens film in which the height $H_L$ of the micro-ball lenses was variously changed as described above were subjected to simulation and the front luminous intensities were measured.

The measured front light intensities are shown in Table 5. Here, the front luminous intensity was expressed as a ratio to the front luminous intensity in Example 7-1 which was defined as 100.

TABLE 5

| | $H_L/D_L$ | Front luminous intensity |
|---|---|---|
| Example 7-1 | 0.5 | 100 |
| Example 7-2 | 0.42 | 104 |
| Example 7-3 | 0.3 | 113 |
| Example 7-4 | 0.25 | 115 |
| Example 7-5 | 0.17 | 115 |
| Example 7-6 | 0.08 | 108 |

As shown in Table 5, when the optical member unit includes the micro-lens film, the prism sheet, and the diffusing sheet, it is preferable that the ratio of the height $H_L$ to the diameter $D_L$ ($H_L/D_L$) of the micro-ball lenses be equal to or more than 0.08 and less than 0.5.

Next, the surface roughness of the micro-ball lenses of the micro-lens film will be described below in detail with reference to examples.

Example 8-1

In Example 8-1, the shape and the surface roughness of the micro-ball lenses of the micro-lens film were variously changed and the front luminous intensity of outgoing light emitted from the backlight unit was calculated by computer simulation.

Specifically, the same light guide plate 30 as in Example 1 was used as the light guide plate.

The optical member unit was configured to be composed of the micro-lens film.

In the micro-lens film, the diameter $D_L$ of the micro-ball lenses when seen from the direction perpendicular to the light exit surface thereof was 60 μm and the pitch of the micro-ball lenses was 60 μm (closest-packing). The ratio of the height $H_L$ to the diameter $D_L$ ($H_L/D_L$) of the micro-ball lenses was changed to 0.5, 0.42, 0.33, 0.25, 0.17, and 0.08, that is, the height $H_L$ was changed to 30 μm, 25 μm, 20 μm, 15 μm, 10 μm, and 4.8 μm and the simulation was performed for each.

The shape of the surface (surface roughness) of the micro-ball lenses was defined using a 255×255 table. The surface shape was changed so that the root-mean-square inclination ZΔq of the surface roughness of the micro-ball lenses is in a range of 0.1 to 0.2 (Condition A), a range of 0.2 to 0.3 (Condition B), a range of 0.4 to 0.6 (Condition C), a range of 0.7 to 0.9 (Condition D), a range of 1.0 to 1.3 (Condition E), a range of 1.4 to 1.9 (Condition F), a range of 3.2 to 4.2 (Condition G), and a range of 5.7 to 7.5 (Condition H), and simulation was performed for each.

the front luminous intensities were measured with the use of the backlight units each including the micro-lens film in which the height $H_L$ and the surface roughness of the micro-ball lenses were variously changed as described above were used to measure.

The measured front luminous intensities are shown in Table 6. Here, the front luminous intensity was expressed as a ratio to a certain front luminous intensity that was defined as 100, the certain front luminous intensity being obtained when using a commonly-used micro-lens film in which the ratio of the height $H_L$ to the diameter $D_L$ of the micro-ball lenses is 0.5 and which has the surface roughness for a specular surface.

ZΔq of the surface roughness of the micro-ball lenses be in a range of 0.7 to 7.2 (Conditions D to H).

Example 8-2

In Example 8-2, the front luminous intensity of outgoing light when the prism sheet was disposed on the side closer to the light exit surface of the micro-lens film according to Example 8-1 was calculated.

A prism sheet with a prism pitch of 50 μm, a thickness of 200 μm, and a prism vertex angle of 90° was used as the prism sheet.

The measured front light intensities are shown in Table 7. Here, the front luminous intensity was expressed as a ratio to a certain front luminous intensity that was defined as 100, the certain front luminous intensity being obtained when using a commonly-used micro-lens film in which the ratio of the height $H_L$ to the diameter $D_L$ of the micro-ball lenses is 0.5 and which has the surface roughness for a specular surface.

TABLE 6

| | Front luminous intensity | | | | | | | |
|---|---|---|---|---|---|---|---|---|
| $H_L/D_L$ | Condition A | Condition B | Condition C | Condition D | Condition E | Condition F | Condition G | Condition H |
| 0.5 | 102 | 100 | 97 | 97 | 98 | 103 | 93 | 86 |
| 0.42 | 101 | 99 | 98 | 99 | 100 | 104 | 94 | 87 |
| 0.3 | 97 | 97 | 97 | 99 | 103 | 107 | 97 | 88 |
| 0.25 | 88 | 91 | 96 | 101 | 105 | 114 | 101 | 93 |
| 0.17 | 84 | 86 | 93 | 101 | 108 | 120 | 111 | 101 |
| 0.08 | 82 | 83 | 90 | 101 | 110 | 126 | 129 | 116 |

As shown in Table 6, in the case where the optical member unit is composed of only the micro-lens film, when the ratio of the height $H_L$ to the diameter $D_L$ ($H_L/D_L$) of the micro-ball lenses is equal to or more than 0.42 and less than 0.5, it is preferable that the root-mean-square inclination ZΔq of the surface roughness of the micro-ball lenses be in a range of 0.1

TABLE 7

| | Front luminous intensity | | | | | | | |
|---|---|---|---|---|---|---|---|---|
| $H_L/D_L$ | Condition A | Condition B | Condition C | Condition D | Condition E | Condition F | Condition G | Condition H |
| 0.5 | 100 | 109 | 109 | 109 | 107 | 91 | 75 | 69 |
| 0.42 | 103 | 110 | 110 | 112 | 107 | 93 | 76 | 71 |
| 0.3 | 109 | 112 | 112 | 113 | 108 | 95 | 79 | 74 |
| 0.25 | 110 | 112 | 112 | 113 | 110 | 98 | 81 | 77 |
| 0.17 | 104 | 109 | 109 | 115 | 111 | 102 | 85 | 81 |
| 0.08 | 84 | 109 | 109 | 118 | 114 | 106 | 88 | 86 | to 0.2 (Condition A) or a range of 1.4 to 1.9 (Condition F). When the ratio $H_L/D_L$ is equal to or less than 0.3, it is preferable that the root-mean-square inclination ZΔq of the surface roughness of the micro-ball lenses be in a range of 1.0 to 1.9 (Conditions E and F). When the ratio $H_L/D_L$ is equal to or less than 0.25, it is preferable that the root-mean-square inclination ZΔq of the surface roughness of the micro-ball lenses be in a range of 0.7 to 4.2 (Conditions D to G). When the ratio $H_L/D_L$ is equal to or more than 0.08 and equal to or less than 0.17, it is preferable that the root-mean-square inclination As shown in Table 7, in the case where the optical member unit is composed of the micro-lens film and the prism sheet, when the ratio of the height $H_L$ to the diameter $D_L$ ($H_L/D_L$) of the micro-ball lenses is less than 0.5, it is preferable that the root-mean-square inclination ZΔq of the surface roughness of the micro-ball lenses be in a range of 0.2 to 1.3 (Conditions B to E). When the ratio $H_L/D_L$ is equal to or more than 0.17 and equal to or less than 0.42, it is preferable that the root-mean-square inclination ZΔq of the surface roughness of the micro-ball lenses be in a range of 0.1 to 1.3 (Conditions A to E). When the ratio $H_L/D_L$ is equal to or more than 0.08 and equal to or less than 0.17, it is preferable that the root-mean-square inclination $Z\Delta q$ of the surface roughness of the micro-ball lenses be in a range of 0.2 to 1.9 (Conditions B to F).

Example 8-3

In Example 8-3, the front luminous intensity of outgoing light when the diffusing sheet was disposed on the side closer to the light exit surface of the micro-lens film according to Example 8-1 was calculated.

A diffusing sheet with total light transmittance of about 90%, a haze value of about 90%, and a thickness of 221 μm was used as the diffusing sheet.

The measured front light intensities are shown in Table 8. Here, the front luminous intensity was expressed as a ratio to a certain front luminous intensity that was defined as 100, the certain front luminous intensity being obtained when using a commonly-used micro-lens film in which the ratio of the height $H_L$ to the diameter $D_L$ of the micro-ball lenses is 0.5 and which has the surface roughness for a specular surface.

$Z\Delta q$ of the surface roughness of the micro-ball lenses be in a range of 0.4 to 4.2 (Conditions C to G).

Example 8-4

In Example 8-4, the front luminous intensity of outgoing light when the diffusing sheet was disposed on the side closer to the light exit surface of the prism sheet which was disposed on the side closer to the light exit surface of the micro-lens film according to Example 8-2 was calculated.

The same diffusing sheet as the diffusing sheet used in Example 8-3 was used.

The measured front light intensities are shown in Table 9. Here, the front luminous intensity was expressed as a ratio to a certain front luminous intensity that was defined as 100, the certain front luminous intensity being obtained when using a commonly-used micro-lens film in which the ratio of the height $H_L$ to the diameter $D_L$ of the micro-ball lenses is 0.5 and which has the surface roughness for a specular surface.

TABLE 8

| | Front luminous intensity | | | | | | | |
|---|---|---|---|---|---|---|---|---|
| $H_L/D_L$ | Condition A | Condition B | Condition C | Condition D | Condition E | Condition F | Condition G | Condition H |
| 0.5 | 98 | 98 | 102 | 102 | 101 | 98 | 83 | 79 |
| 0.42 | 100 | 100 | 102 | 105 | 102 | 99 | 85 | 80 |
| 0.3 | 100 | 101 | 104 | 105 | 106 | 102 | 85 | 81 |
| 0.25 | 100 | 102 | 103 | 105 | 106 | 106 | 93 | 88 |
| 0.17 | 95 | 97 | 103 | 105 | 110 | 110 | 98 | 90 |
| 0.08 | 91 | 92 | 100 | 106 | 110 | 115 | 106 | 100 |

As shown in Table 8, in the case where the optical member unit is composed of the micro-lens film and the diffusing sheet, when the ratio of the height $H_L$ to the diameter $D_L$ ($H_L/D_L$) of the micro-ball lenses is less than 0.5, it is preferable that the root-mean-square inclination $Z\Delta q$ of the surface

TABLE 9

| | Front luminous intensity | | | | | | | |
|---|---|---|---|---|---|---|---|---|
| $H_L/D_L$ | Condition A | Condition B | Condition C | Condition D | Condition E | Condition F | Condition G | Condition H |
| 0.5 | 103 | 105 | 106 | 107 | 107 | 96 | 83 | 77 |
| 0.42 | 107 | 108 | 109 | 107 | 107 | 97 | 88 | 83 |
| 0.3 | 112 | 111 | 114 | 109 | 107 | 98 | 90 | 82 |
| 0.25 | 115 | 115 | 114 | 110 | 105 | 100 | 92 | 86 |
| 0.17 | 116 | 116 | 115 | 115 | 110 | 105 | 92 | 90 |
| 0.08 | 115 | 116 | 118 | 118 | 113 | 106 | 96 | 93 | roughness of the micro-ball lenses be in a range of 0.4 to 1.3 (Conditions C to E). When the ratio $H_L/D_L$ is equal to or less than 0.3, it is preferable that the root-mean-square inclination $Z\Delta q$ of the surface roughness of the micro-ball lenses be in a range of 0.4 to 1.9 (Conditions C to F). When the ratio $H_L/D_L$ is 0.08, it is preferable that the root-mean-square inclination As shown in Table 9, in the case where the optical member unit is composed of the micro-lens film, the prism sheet, and the diffusing sheet, when the ratio of the height $H_L$ to the diameter $D_L$ ($H_L/D_L$) of the micro-ball lenses is less than 0.5, it is preferable that the root-mean-square inclination $Z\Delta q$ of the surface roughness of the micro-ball lenses be in a range of 0.1 to 1.3 (Conditions A to E). When the ratio $H_L/D_L$ is equal to or more than 0.08 and equal to or less than 0.17, it is preferable that the root-mean-square inclination $Z\Delta q$ of the surface roughness of the micro-ball lenses be in a range of 0.1 to 1.9 (Conditions A to F).

While the planar lighting device according to the present invention has been described in detail, the present invention is not limited to the above-mentioned embodiments but may be improved or modified in various forms without departing from the gist of the present invention.

What is claimed is:

1. A planar lighting device comprising:
  a light guide plate that includes a rectangular light exit surface, one or more light incidence surfaces which are each disposed on an end side of the light exit surface and through which light traveling in a direction substantially parallel to the light exit surface enters, a rear surface on an opposite side to the light exit surface, scattering particles dispersed in the light guide plate, and two or more layers overlapping in a direction substantially perpendicular to the light exit surface and having different particle concentrations of the scattering particles,
  wherein the two or more layers of the light guide plate include a first layer having a particle concentration of the scattering particles represented by Npo and being located on a side closer to the light exit surface, and a second layer having a particle concentration of the scattering particles represented by Npr and being located on a side closer to the rear surface, and
  wherein thicknesses of the two or more layers in the direction substantially perpendicular to the light exit surface vary individually such that the thickness of the second layer continuously varies so that the thickness of the second layer increases, then decreases, and increases again with increasing distance from the one or more light incidence surfaces in a direction perpendicular to the one or more light incidence surfaces so that a combined particle concentration of the light guide plate has, in a direction perpendicular to one of the one or more light incidence surfaces, a first local maximum value on a side closer to one of the one or more light incidence surfaces and a second local maximum value located at a position more distant from one of the one or more light incidence surfaces than the position of the first local maximum value and being larger than the first local maximum value;
  one or more light source units, the one light source unit being so disposed as to face one of the one or more light incidence surfaces of the light guide plate; and
  an optical member unit including a micro-lens film in which a plurality of spherical micro-ball lenses are formed on a film, the optical member unit being disposed on the light exit surface of the light guide plate.

2. The planar lighting device according to claim 1, wherein one of the one or more light incidence surfaces include two light incidence surfaces separately disposed on two opposite end sides of the light exit surface, the combined particle concentration of the light guide plate having two first local maximum values in a direction perpendicular to the one light incidence surface, and the positions of the two first local maximum values are located on each of both sides closer to the two light incidence surfaces.

3. The planar lighting device according to claim 2, wherein the thickness of the second layer has a largest thickness at a central portion of the light exit surface.

4. The planar lighting device according to claim 1, wherein the one light incidence surface is disposed on an end side of the light exit surface, and the combined particle concentration of the light guide plate has one first local maximum value in a direction perpendicular to the one light incidence surface.

5. The planar lighting device according to claim 1, wherein ranges of Npo and Npr satisfy Npo=0 wt % and 0.01 wt %<Npr<0.8 wt %.

6. The planar lighting device according to claim 1, wherein ranges of Npo and Npr satisfy 0 wt %<Npo<0.15 wt % and Npo<Npr<0.8 wt %.

7. The planar lighting device according to claim 1, wherein the rear surface is a flat surface parallel to the light exit surface.

8. The planar lighting device according to claim 1, wherein a diameter of the micro-ball lenses of the micro-lens film ranges from 10 μm to 100 μm.

9. The planar lighting device according to claim 1, wherein the micro-ball lenses are randomly arranged on the film.

10. The planar lighting device according to claim 1, wherein the optical member unit is the micro-lens film, and
  wherein when a diameter of the micro-ball lenses is $D_L$ and a height thereof is $H_L$, the relationship of the diameter $D_L$ and the height $H_L$ of the micro-ball lenses satisfies $0.42 \leq H_L/D_L < 0.5$.

11. The planar lighting device according to claim 1, wherein the optical member unit comprises the micro-lens film and a prism sheet, and
  wherein when a diameter of the micro-ball lenses is $D_L$ and a height thereof is $H_L$, the relationship of the diameter $D_L$ and the height $H_L$ of the micro-ball lenses satisfies $0.17 \leq H_L/D_L < 0.5$.

12. The planar lighting device according to claim 1, wherein the optical member unit comprises the micro-lens film and a diffusing sheet, and
  wherein when a diameter of the micro-ball lenses is $D_L$ and a height thereof is $H_L$, the relationship of the diameter $D_L$ and the height $H_L$ of the micro-ball lenses satisfies $0.3 < H_L/D_L < 0.5$.

13. The planar lighting device according to claim 1, wherein the optical member unit comprises the micro-lens film, a prism sheet, and a diffusing sheet, and
  wherein when a diameter of the micro-ball lenses is $D_L$ and a height thereof is $H_L$, the relationship of the diameter $D_L$ and the height $H_L$ of the micro-ball lenses satisfies $0.08 \leq H_L/D_L < 0.5$.

14. The planar lighting device according to claim 1, wherein the optical member unit is the micro-lens film, and
  wherein a ratio $H_L/D_L$ of a diameter $D_L$ and a height $H_L$ of the micro-all lenses is equal to or more than 0.42 and less than 0.5 and a root-mean-square inclination of surface roughness of the micro-ball lenses ranges from 0.1 to 0.2 or from 1.4 to 1.9.

15. The planar lighting device according to claim 1, wherein the optical member unit is the micro-lens film, and
  wherein a ratio $H_L/D_L$ of a diameter $D_L$ and a height $H_L$ of the micro-ball lenses is equal to or more than 0.08 and equal to or less than 0.3 and a root-mean-square inclination of surface roughness of the micro-ball lenses ranges from 1.0 to 1.9.

16. The planar lighting device according to claim 1, wherein the optical member unit is the micro-lens film, and
  wherein a ratio $H_L/D_L$ of a diameter $D_L$ and a height $H_L$ of the micro-ball lenses is equal to or more than 0.08 and equal to or less than 0.25 and a root-mean-square inclination of surface roughness of the micro-ball lenses ranges from 0.7 to 4.2.

17. The planar lighting device according to claim 1, wherein the optical member unit is the micro-lens film, and wherein a ratio $H_L/D_L$ of a diameter $D_L$ and a height $H_L$ of the micro-ball lenses is equal to or more than 0.08 and equal to or less than 0.17 and a root-mean-square inclination of surface roughness of the micro-ball lenses ranges from 0.7 to 7.2.

18. The planar lighting device according to claim 1, wherein the optical member unit comprises the micro-lens film and a prism sheet, and
wherein a ratio $H_L/D_L$ of a diameter $D_L$ and a height $H_L$ of the micro-ball lenses is equal to or more than 0.08 and less than 0.5 and a root-mean-square inclination of surface roughness of the micro-ball lenses ranges from 0.2 to 1.3.

19. The planar lighting device according to claim 1, wherein the optical member unit comprises the micro-lens film and a prism sheet, and
wherein a ratio $H_L/D_L$ of a diameter $D_L$ and a height $H_L$ of the micro-ball lenses is equal to or more than 0.17 and equal to or less than 0.42 and a root-mean-square inclination of surface roughness of the micro-ball lenses ranges from 0.1 to 1.3.

20. The planar lighting device according to claim 1, wherein the optical member unit comprises the micro-lens film and a prism sheet, and
wherein a ratio $H_L/D_L$ of a diameter $D_L$ and a height $H_L$ of the micro-ball lenses is equal to or more than 0.08 and equal to or less than 0.17 and a root-mean-square inclination of surface roughness of the micro-ball lenses ranges from 0.2 to 1.9.

21. The planar lighting device according to claim 1, wherein the optical member unit comprises the micro-lens film and a diffusing sheet, and
wherein a ratio $H_L/D_L$ of a diameter $D_L$ and a height $H_L$ of the micro-ball lenses is equal to or more than 0.08 and less than 0.5 and a root-mean-square inclination of surface roughness of the micro-ball lenses ranges from 0.4 to 1.3.

22. The planar lighting device according to claim 1, wherein the optical member unit comprises the micro-lens film and a diffusing sheet, and
wherein a ratio $H_L/D_L$ of a diameter $D_L$ and a height $H_L$ of the micro-ball lenses is equal to or more than 0.08 and equal to or less than 0.3 and a root-mean-square inclination of surface roughness of the micro-ball lenses ranges from 0.4 to 1.9.

23. The planar lighting device according to claim 1, wherein the optical member unit comprises the micro-lens film and a diffusing sheet, and
wherein a ratio $H_L/D_L$ of a diameter $D_L$ and a height $H_L$ of the micro-ball lenses is 0.08 and a root-mean-square inclination of surface roughness of the micro-ball lenses ranges from 0.4 to 4.2.

24. The planar lighting device according to claim 1, wherein the optical member unit comprises the micro-lens film, a prism sheet, and a diffusing sheet, and
wherein a ratio $H_L/D_L$ of a diameter $D_L$ and a height $H_L$ of the micro-ball lenses is equal to or more than 0.08 and less than 0.5 and a root-mean-square inclination of surface roughness of the micro-ball lenses ranges from 0.1 to 1.3.

25. The planar lighting device according to claim 1, wherein the optical member unit includes the micro-lens film, a prism sheet, and a diffusing sheet, and
wherein a ratio $H_L/D_L$ of a diameter $D_L$ and a height $H_L$ of the micro-ball lenses is equal to or more than 0.08 and equal to or less than 0.17 and a root-mean-square inclination of surface roughness of the micro-ball lenses ranges from 0.1 to 1.9.

\* \* \* \* \*